United States Patent
Russell et al.

(10) Patent No.: US 12,487,117 B2
(45) Date of Patent: Dec. 2, 2025

(54) SIGNAL PROCESSING METHODS FOR AN OPTICAL DETECTION SYSTEM

(71) Applicant: SINTELA LIMITED, Bristol (GB)

(72) Inventors: Stuart Russell, Bristol (GB); Andrew Weld, Bristol (GB)

(*) Notice: Subject to any disclaimer, the term of this patent is extended or adjusted under 35 U.S.C. 154(b) by 107 days.

(21) Appl. No.: 18/691,745

(22) PCT Filed: Sep. 13, 2022

(86) PCT No.: PCT/EP2022/075445
§ 371 (c)(1),
(2) Date: Mar. 13, 2024

(87) PCT Pub. No.: WO2023/041540
PCT Pub. Date: Mar. 23, 2023

(65) Prior Publication Data
US 2024/0393164 A1   Nov. 28, 2024

(30) Foreign Application Priority Data
Sep. 14, 2021   (GB) .................................. 2113095

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC ...... G01H 9/004; G01H 9/00; G01D 5/35361; G01D 5/353
See application file for complete search history.

(56) References Cited

FOREIGN PATENT DOCUMENTS

| GB | 2628594 A | * 10/2024 | ............. G01H 9/004 |
| WO | 2021069481 A2 | 4/2021 | |

OTHER PUBLICATIONS

International Search Report for corresponding PCT/EP2022/075445 dated Dec. 6, 2022.
Written Opinion of the International Searching Authority for corresponding PCT/EP2022/075445 dated Dec. 6, 2022.
(Continued)

*Primary Examiner* — Tony Ko
(74) *Attorney, Agent, or Firm* — Egbert, McDaniel & Swartz, PLLC

(57) ABSTRACT

Disclosed are signal processing methods for an optical detection system, and corresponding systems. An example is a signal processing method for a distributed acoustic sensing system which utilizes spread spectrum pulses transmitted along an optical path, where a scattered signal that was scattered at a scattering location along an optical path is received and interfered with a local oscillator signal to generate a first carrier signal that is modulated by a phase difference between the local oscillator and scattered signals. The first carrier signal is then processed to generate a second carrier signal that is modulated by a spatial differential of the phase difference. Pulse compression is then performed on the second carrier signal. The spatial differential of the phase difference is directly related to the strain (or acoustic environment) of the optical path at the scattering location, and so enables the strain at the scattering location to be estimated.

21 Claims, 12 Drawing Sheets

(56) References Cited

OTHER PUBLICATIONS

International Preliminary Report on Patentability for corresponding PCT/EP2022/075445 dated Jul. 12, 2023.
Chen et al., "108-km Distributed Acoustic Sensor With 220-p . . . Strain Resolution and 5-m Spatial Resolution", Sep. 15, 2019 (Sep. 15, 2019), vol. 37, No. 18, p. 4462-4468.
Zou et al., "Optical pulse compression reflectometry: proposal and proof-of-concept experiment", Optics Express, vol. 23, No. 1, Jan. 12, 2015 (Jan. 12, 2015), p. 512.
Xiong et al., "Single-Shot COTDR Using Sub-Chirped-Pulse Extraction Algorithm for Distributed Strain Sensing", Jan. 22, 2020 (Jan. 22, 2020), vol. 38, No. 7, p. 2028-2036.
Zhang et al., "Long range fading free phase-sensitive reflectometry based on multi-frequency NLFM pulse", arxiv.org, Cornell University Library, 201 Olin Library Cornell University Ithaca, NY 14853, Mar. 21, 2018 (Mar. 21, 2018).
Search Report for Priority Application GB2113095.0 dated May 30, 2022.

* cited by examiner

SIGNAL PROCESSING METHODS FOR AN OPTICAL DETECTION SYSTEM

TECHNICAL FIELD

The invention relates to signal processing methods for an optical detection system, and systems for carrying out such processing.

BACKGROUND TO THE INVENTION

Distributed Acoustic Sensing (DAS) is an established technology with several commercial systems available. In these systems, a pulse or pulses of laser light are launched into a length of optical fiber and the light that is scattered within the fiber is analysed in order to derive the nature of the acoustic environment, i.e. any physical vibrations, of the fiber transducer. In particular, these systems typically make a measurement of the acoustic strain environment of an optical fiber transducer using an optical time domain reflectometer (OTDR) approach. This gives a differential strain measurement as a function of position along the optical fiber.

As an optical fiber is manufactured it is cooled or quenched from a high temperature as it is drawn. This process leads to the presence of small variations in the density of the optical fibre. These tiny variations in density equate to variations in the effective refractive index of the fiber. These discontinuities lead to scattering of laser light passing through the optical fiber, particularly by Rayleigh scattering. The amplitude of the scattering follows a Rayleigh distribution, but the phase angle of the scattering is uniformly distributed around a unit circle, i.e. $-\pi \leq \Phi \leq \pi$ where $\Phi$ is the phase angle.

For a single pulse system the length of the fiber limits the pulse repetition frequency (PRF) possible, as only one laser light pulse should interrogate the fiber at a given time. Therefore, a pulse is only sent down the optical fiber when the previous pulse has had time to travel the full length of the fiber and the scattered light return to the detector. As a result, the acoustic environment at any location of the fiber can only be sampled at the PRF and this sets an inherent limit on the maximum acoustic frequency that can be sampled with a single pulse system, related to the Nyquist limit.

Many systems only measure the amplitude of the light scattered by the fiber, which yields a result that correlates to the acoustic field only for small amplitude strains and only when correct fiber scatter bias conditions, i.e. the resulting scatter amplitude and phase as a result of the coherent sum of the scattering of light from all of the scattering sites which are illuminated at a given time, are met. For large acoustic strains or incorrect fiber scatter bias conditions these systems significantly distort the measurement of the acoustic field leading to the generation of higher frequency components which do not truly represent the amplitude or time evolution of the vibrations which are affecting the optical fiber. Systems of this nature however do give a measure of the acoustic energy and have found application for long range installations such as pipeline monitoring and borders, where detection of activity is the primary goal and a truly accurate measurement of the acoustic field is not required. Systems of this nature can be termed 'qualitative' systems. Operational ranges of less than 50 km, and spatial resolutions of the order of more than 20 m at these ranges are typical for such systems.

Other systems simultaneously measure the amplitude and phase of the scattered light, typically by comparing the phase of two sequential pulses or by comparing the phase of one pulse with a delayed copy of itself. In each case, said pulses are allowed to optically interfere and the resulting interference is measured.

These systems yield a response which is generally linearly related to the acoustic field and the response provides a much higher dynamic range. Such systems are therefore able to represent much larger strains in the optical fiber and with much greater correlation to the acoustic field than 'qualitative' methods as described above. However, typically the operational range of systems of this nature is limited and therefore are targeted at shorter range applications, for example down hole seismic measurements. Systems of this nature can be termed 'quantitative' systems. Operational ranges of 10 km or less, and spatial resolutions of the order of 10 m are typical for such systems.

Another way of measuring the amplitude and phase of the scattered light in a 'quantitative' system is to use a local oscillator reference signal and measure the phase of the scattered light in relation to this reference. This method is termed coherent detection. Coherent detection has found application in communications and sensors in various forms over the past 30 years. It offers not only a coherent measurement of both phase and amplitude but also a detection noise floor much lower than direct detection methods and hence the potential for improved range and spatial resolution performance when compared to other commercial systems. However the performance of coherent detection systems are limited by the amount of energy in each measurement. The noise in the detection system is limited by the shot noise generated by the local oscillator reference signal, which is fundamental and cannot be reduced using traditional methods. The simplest way to increase the performance of such systems is the increase the duration of each pulse sent into the fiber. However, although this increases the energy per measurement, the spatial resolution of the system is decreased.

The present invention addresses these problems to provide an improvement to optical detection systems.

SUMMARY OF THE INVENTION

At its most general, the present invention provides a signal processing method for a distributed acoustic sensing (DAS) system which utilises spread spectrum pulses to be transmitted along an optical path, where a scattered signal that was scattered at a scattering location along an optical path is received and interfered with a local oscillator signal to generate a first carrier signal that is modulated by a phase difference between the local oscillator signal and the scattered signal. The first carrier signal is then processed in order to generate a second carrier signal that is modulated by a spatial differential of the phase difference. Pulse compression is then performed on the second carrier signal. The spatial differential of the phase difference is directly related to the strain (or acoustic environment) of the optical path at the scattering location, and so enables the strain at the scattering location to be estimated. By using spread spectrum pulses in this way, the signal-to-noise ratio (SNR) of the distributed acoustic sensing system is increased, and the operational range improved without a reduction in spatial resolution.

According to a first aspect of the invention, there is provided a signal processing method for a distributed acoustic sensing system, the method comprising: transmitting a spread spectrum pulsed test signal along an optical path, for example as one or more spread spectrum pulses; receiving, at a detector stage, a scattered signal that was scattered at a location along the optical path; receiving, at the detector stage, a local oscillator signal; generating, based on an interference of the scattered signal and the local oscillator signal, a first complex carrier signal that is modulated by a phase difference between the local oscillator signal and the scattered signal; processing the first complex carrier signal to generate a spread spectrum second complex carrier signal that is modulated by a spatial differential of the phase difference, the spatial differential being taken along a length of the optical path; pulse compressing the second complex carrier signal; and determining, based on the pulse compressed second complex carrier signal, a value representative of the spatial differential of the phase difference for the location along the optical path. In this way, the present invention may provide a signal processing method for a DAS system in which a signal-to-noise ratio and an operational range can be improved, without a reduction in spatial resolution which arises from known methods. As the second complex carrier signal is also a spread spectrum signal, pulse compressing the second complex carrier signal provides good side lobe rejection and good spatial resolution in order to determine the spatial differential of the phase difference along the optical path. It will be appreciated that properties of the second complex carrier signal, and therefore also of the pulse compressed complex carrier signal, are affected by the properties of the original spread spectrum test pulse or pulses, and so predetermined sidelobe rejection and spatial resolution properties appropriate for a given sensing application may be achieved by configuring properties of the spread spectrum test signal as described herein.

A spread spectrum signal, for example a spread spectrum pulsed test signal or a spread spectrum second complex carrier signal, should be understood as a signal which is spread in the frequency domain. That is, the instantaneous frequency of the signal changes over time and over the duration of the signal, such that the instantaneous frequency is modulated with what is referred to herein as an instantaneous frequency function. In other words, the instantaneous frequency function shows how the instantaneous frequency of the signal varies with time. The instantaneous frequency function may also be referred to herein as a chirp or chirp function, or a spread spectrum modulation.

The bandwidth over which the instantaneous frequency of the spread spectrum pulsed test signal is changed over the length of a pulse sets the spatial resolution and the required detection bandwidth, and so in some embodiments the bandwidth of the instantaneous frequency function may be adjustable in order to achieve a predetermined resolution. For example, a linear instantaneous frequency function with a 100 MHz bandwidth may yield a 1 m to 3 m spatial resolution after pulse compression of the second complex carrier signal, wherein the spatial resolution may also depend upon the pulse window or envelope function as discussed herein. In particular, the length of the pulse may not affect the spatial resolution, but a longer pulse may be used to increase the signal to noise ratio (SNR) if required.

The optical path may include an optical fiber (which may be referred to herein as a fiber under test), which may act as a transducer of the DAS.

The optical path (e.g. optical fiber) may include a plurality of scattering sites distributed along the length of the optical path, e.g. caused by variations in refractive index along the length of the optical path. When a pulse of the spread spectrum pulsed test signal travels along the optical path (e.g. optical fiber), light in the pulse may be scattered at various locations (i.e. at the scattering sites) along the length of the optical path. For example, light in the pulse may be backscattered via Rayleigh scattering of the pulse at various locations along the length of the optical path. Scattering of light in the pulse at a location along the optical path may result in a scattered signal associated with that location. Thus, a pulse of the test signal travelling along the optical path may result in a plurality of scattered signals, each scattered signal having been scattered at a respective location (i.e. scattering site) along the optical path. The scattered signals may be guided back along the optical path, such that they are received by the detector stage.

The optical path (e.g. optical fiber) may be subjected to one or more modulations, such as acoustic modulations, at one or more locations along the optical path. Such modulations may result in a strain at one or more locations along the optical path, which may cause changes in the scattering of the pulsed test signal, e.g. due to local variations in refractive index and length of the optical path.

The location on the optical path at which the scattered signal was scattered may be determined based on a time of receipt of the scattered signal at the detector stage. For example, the location on the optical path may be determined by comparing a time at which a pulse of the test signal was launched along the optical path, and the time of receipt of the scattered signal at the detector stage, taking into account the speed of light along the optical path.

The DAS includes a detector stage that is arranged to receive scattered signals from the optical path and the local oscillator signal. The detector stage may include an optical detector which is arranged to output a signal that is representative of an intensity of incident light on the detector. For example, the detector stage may include a square law detector. A square law detector may output a signal having an intensity that is proportional to the square of the field amplitude of incident light on the detector. The detector stage may also be referred to herein as a detector system.

The local oscillator signal may be a continuous wave coherent light signal that is interfered with the received scattered signal at the detector stage.

Both the local oscillator signal and the scattered signal may be incident on the detector of the detector stage, such that they interfere at the detector. As a result, the detector (e.g. square law detector) may produce an output signal that is related to an intensity produced by the interference of the local oscillator signal and the scattered signal. The output signal from the detector may be in the form of a carrier signal (e.g. a real carrier signal) that carries a phase difference between the scattered signal and the local oscillator signal. The first complex carrier signal may then be generated based on the output signal. For example, generating the first complex carrier signal may include passing the output signal through a digital down conversion stage. Thus, the first complex carrier signal is also modulated by a phase difference between the local oscillator and the scattered signal.

Scattering of the pulsed test signal along the optical path may result in a phase shift of the scattered signal relative to the local oscillator. As a result, a scattered signal that was scattered at a location along the optical path may have a phase relative to the local oscillator that corresponds to a cumulative sum of any and all phase modulations along the length of the optical path up to that location. Therefore, the phase difference carried by the first complex carrier signal may correspond to a cumulative sum of phase modulations along a length of the optical path up to the location where the scattered signal was scattered.

The first complex carrier is digitally processed to generate a spread spectrum second complex carrier signal that is modulated by a spatial differential of the phase difference. The spatial differential may represent a variation of the phase difference over a chosen length increment (or gauge length) of the optical path, at the location along the optical path where the scattered signal was scattered. As a result, it is possible to determine a value representative of the spatial differential of the phase difference for the location along the optical path, which may enable the strain or acoustic environment of the optical path to be determined.

Herein, a length increment, gauge length, or delay may be referred to as "chosen" to indicate that it may be set by a user. A "chosen" length increment, gauge length, or delay may also be said to be "predetermined".

The DAS may include a coherent light source which is configured to emit continuous wave coherent light. Light emitted by the coherent light source may be split (e.g. by a beam-splitter) between two paths, so that a first portion of the light from the coherent light source is transmitted along a local oscillator path, and a second portion is transmitted a pulse generator which is configured to generate the spread spectrum pulsed test signal.

In some embodiments, the DAS may be a heterodyne detection system, in which case a frequency of the spread spectrum pulsed test signal may be shifted relative to a frequency of the local oscillator signal. In other embodiments, the DAS may be a homodyne detection system, in which case the frequency of the spread spectrum pulsed test signal and the local oscillator signal may be the same.

The DAS system may be a polarisation diverse system. For example, the local oscillator signal or the scattered signal may be split into components having different polarisations, e.g. vertical and horizontal polarisation. The detector stage may then include a detector for each polarisation state, such that a separate analysis of the signals may be performed for each polarisation state. This may serve to ensure that interference of the scattered signal and local oscillator signal can be detected for at least one of the polarisation states, e.g. in cases where polarisation of the scattered signal varies relative to polarisation of the local oscillator signal.

In embodiments of the present invention, a value representative of the spatial differential of the phase difference for the location along the optical path may be determined according to methods as set out in GB 2588177 A. For example, the pulse-compressed second complex carrier signal may be passed to a rectangular-to-polar (RP) coordinate transform, or a vector stacking method may be used to determine a value representative of the spatial differential. It will be appreciated that any appropriate method may be used to determine a value representative of the spatial differential from the pulse compressed second complex carrier signal.

Optionally, transmitting a spread spectrum pulsed test signal may comprise: transmitting a pulsed test signal with a linearly increasing instantaneous frequency function (which may be referred to herein as a test signal with a linear chirp, or a linearly chirped test signal); and/or transmitting a pulsed test signal with a non-linearly increasing instantaneous frequency function (which may be referred to herein as a test signal with a non-linear chirp, or a non-linearly chirped test signal). For example, a non-linearly increasing instantaneous frequency function may be parabolic such that the second complex carrier signal has a linear instantaneous frequency function as explained herein. In another example, a non-linearly increasing instantaneous frequency function may be hyperbolic.

Advantageously, the spread spectrum pulsed test signal is configured to provide a pulse compressed complex carrier signal having a predetermined side lobe rejection threshold and central lobe width. For example, a sidelobe rejection threshold may be greater than 20 dB, such as greater than 60 dB. A central lobe width may be less than 3.5 m, for example 2.2 m. In certain embodiments, in order to achieve a predetermined sidelobe rejection threshold and central lobe width, the pulse window of the spread spectrum test signal may be adjusted. In other embodiments, the spread spectrum pulsed test signal may be configured to provide a second complex carrier signal having a hyperbolic instantaneous frequency function in order to achieve good autocorrelation properties without requiring a window function to be applied to the spread spectrum pulsed test signals or the second complex carrier signal.

In some examples, the spread spectrum pulsed test signal may have a pulse window defined by a square-root Blackman function to provide a second complex carrier signal having a pulse window defined by a Blackman function which may provide improved sidelobe rejection after pulse compression as described below. The properties of the square-root Blackman function may thereby be adjusted to provide the predetermined side lobe rejection threshold and central lobe width of the Blackman function associated with the pulse compressed second complex carrier signal. In other example, the pulse window of the spread spectrum test signal may be described by a square root rectangular window function (a sine window), to provide a second complex carrier signal having a pulse window defined by a rectangular window which may provide improved central lobe width (i.e. a narrower central lobe width and thereby higher spatial resolution) after pulse compression as described below. However, any other pulse windows may be used as appropriate.

Preferably, pulse compressing the second complex carrier signal may comprise correlating the second complex carrier signal with a time-reversed, conjugated copy of an instantaneous frequency function (that is, the chirp or spread spectrum modulation) of the spread spectrum second complex carrier signal. That is, the function which the second complex carrier signal is correlated with for pulse compression is dependent upon the instantaneous frequency function of the second complex carrier signal.

In some embodiments, the step of processing the first complex carrier signal may comprise digitally simulating interference of the first complex carrier signal with a delayed copy of the first complex carrier signal, to generate the second complex carrier signal. The inventors have realised that by digitally simulating interference in this manner, it is possible to obtain a second complex signal that is modulated by the spatial differential of the phase difference. Additionally, by digitally simulating interference in this manner, it is possible to avoid the cost and complications of using additional optical components that may be required to achieve similar effects optically. The second complex carrier signal may correspond to a simulated output signal of a detector (e.g. a square law detector) at which the first complex carrier signal and its delayed copy interfere. The delayed copy of the first complex carrier signal may be delayed (i.e. shifted) by a chosen length increment (or gauge length) of the optical path relative to the first complex carrier signal. The length increment may be set according to a desired gauge length of the measurement.

The inventors have realised that multiplying a complex conjugate of the first complex carrier signal with a delayed copy of the first complex carrier signal is equivalent to digitally simulating interference of the first complex carrier signal with a delayed copy of the first complex carrier signal. Multiplying the complex conjugate of the first complex carrier signal with a delayed copy of the first complex carrier signal may be computationally simpler than digitally simulating interference of the first complex carrier signal with a delayed copy of the first complex carrier signal.

In some embodiments, the spread spectrum pulsed test signal may include a first spread spectrum pulse and a second spread spectrum pulse. That is, transmitting the spread spectrum pulsed test signal may comprise: transmitting a first spread spectrum test pulse and a second spread spectrum test pulse, wherein the second spread spectrum test pulse is delayed relative to the first spread spectrum test pulse, and wherein the first spread spectrum test pulse and the second spread spectrum test pulse have different instantaneous frequency functions. Preferably the instantaneous frequency functions for the first spread spectrum test pulse and the second spread spectrum test pulse are configured such that the difference between the modulation bandwidths of the first spread spectrum test pulse and the second spread spectrum test pulse allows adequate bandwidth required to represent scattering (e.g. Rayleigh scattering) of the test signals along the optical path. Advantageously, the instantaneous frequency functions for the first spread spectrum test pulse and the second spread spectrum test pulse are configured such that there is no crosstalk between the first spread spectrum test pulse and the second spread spectrum test pulse, allowing the scatter from each test pulse to be separable in the frequency domain. The delay between the first spread spectrum test pulse and the second spread spectrum test pulse may be set based on a desired gauge length for the spatial differential of the phase difference. Indeed, the delay between the first test pulse and the second test pulse may correspond to a gauge length of the spatial differential of the phase difference.

Advantageously, the first spread spectrum test pulse and the second spread spectrum test pulse may each have a linearly increasing instantaneous frequency function.

In certain embodiments, the instantaneous frequency of the second test pulse may be a fixed multiple of the first spread spectrum test pulse along the length of the second test pulse. For example, the instantaneous frequency of the second test pulse may be double, or three times, or any other suitable multiple, that of the first spread spectrum test pulse. By providing a first spread spectrum test pulse and a second spread spectrum test pulse in this way, it can be ensured that the second complex carrier signal also has a linearly increasing instantaneous frequency function. In particular, the instantaneous frequency function of the second complex carrier signal may have a gradient equal to the difference between the gradients of the instantaneous frequency functions of the first spread spectrum test signal and second spread spectrum test signal.

In other embodiments, at least one of the first spread spectrum test pulse and the second spread spectrum test pulse may have a non-linearly increasing instantaneous frequency function. For example, this may result in a second complex carrier signal having a non-linear instantaneous frequency function, which may be suitable for providing doppler tolerance in certain applications, and which may give predetermined autocorrelation properties. For example, the second complex carrier signal may have a hyperbolic instantaneous frequency function. A hyperbolic function in this way may be particularly advantageous as a window function does not need to be applied to the second complex carrier signal in order to achieve good autocorrelation when pulse compression is carried out. Other examples of non-linearly increasing instantaneous frequency functions may include parabolic functions.

By transmitting a first spread spectrum test pulse and a second spread spectrum test pulse in this way, the scattered signal may include a first scattered signal corresponding to the first spread spectrum test pulse and a second scattered signal corresponding to the second spread spectrum test pulse. Both the first scattered signal and the second scattered signal may be received simultaneously at the detector stage, where they interfere with local oscillator signal. Generating the first complex carrier signal may therefore include generating a first complex carrier signal associated with the first scattered signal and a first complex carrier signal associated with the second scattered signal; and the step of processing the first complex carrier signal may include processing the first complex carrier signal associated with the first scattered pulse and the first complex carrier signal associated with the scattered pulse to generate the second complex carrier signal. The first complex carrier signal associated with the first scattered signal may be modulated by a phase difference between the local oscillator and the first scattered pulse. In particular, the first complex carrier signal associated with the first scattered signal may be modulated by a phase difference between the local oscillator signal and the first scattered pulse; and the first complex carrier signal associated with the second scattered signal may be modulated by a phase difference between the local oscillator signal and the second scattered pulse.

Processing the first complex carrier signal associated with the first scattered signal and the first complex carrier signal associated with the second scattered signal may include multiplying the first complex carrier signal associated with the first scattered signal by a complex conjugate of the first complex carrier signal associated with the second scattered signal. The inventors have found that performing such an operation results in a second complex carrier signal that is modulated by the phase difference between the two scattered signal and, since the two pulses are delayed relative to each other, the spatial differential of the strain along the fiber. It will be appreciated that the second complex carrier signal is also a spread spectrum signal, the instantaneous frequency function of which is dependent on the properties of the first spread spectrum test pulse and second spread spectrum test pulse as described herein.

According to a second aspect of the invention, there is a provided a distributed acoustic sensing system comprising: a pulse generator configured to transmit a spread spectrum pulsed test signal along an optical path; a detector stage configured to receive a test signal that was scattered along an optical path and a local oscillator signal; and a controller configured to perform a method according to a first aspect of the invention described above. In this way, the present invention provides a distributed acoustic sensing system which has a longer operational range and an improved signal-to-noise ratio compared with known systems. In addition to those method steps detailed above, the controller may be configured to determine, based on the pulse compressed second complex carrier signal, a value representative of the spatial differential of the phase difference for the location along the optical path according to methods as set out in GB 2588177 A. For example, the pulse-compressed second complex carrier signal may be passed to a rectangular-to-polar (RP) coordinate transform, or a vector stacking method may be used to determine a value representative of the spatial differential. It will be appreciated that any appropriate method may be used to determine a value representative of the spatial differential from the pulse compressed second complex carrier signal.

Preferably, the pulse generator may be configured to generate a first spread spectrum test pulse and a second spread spectrum test pulse, wherein the second spread spectrum test pulse is delayed relative to the first spread spectrum test pulse. This delay sets the gauge length for the measurement of modulations in the optical path, as discussed herein. In certain embodiments, the first spread spectrum test pulse and the second spread spectrum test pulse may have different instantaneous frequency functions. For example, the instantaneous frequency functions for the first spread spectrum test pulse and the second spread spectrum test pulse are configured such that the difference between the modulation bandwidths of the first spread spectrum test pulse and the second spread spectrum test pulse allows adequate bandwidth required to represent scattering (e.g. Rayleigh scattering) of the test signals along the optical path. Advantageously, the instantaneous frequency functions for the first spread spectrum test pulse and the second spread spectrum test pulse are configured such that there is no crosstalk between the first spread spectrum test pulse and the second spread spectrum test pulse, allowing the scatter from each test pulse to be separable in the frequency domain. Advantageously, the pulse generator may comprise a variable optical delay line, which may allow the user or operator of the system to adjust the relative delay between the first spread spectrum test pulse and the second spread spectrum test pulse and thereby adjust the gauge length for the system as desired.

Optionally, the pulse generator may comprise a first optic modulator configured to generate the first spread spectrum test pulse and a second optic modulator configured to generate the second spread spectrum test pulse. For example, each of the first optic modulator and the second optic modulator may be acousto-optic modulators to generate a pulse and introduce an instantaneous frequency function to the test pulses. For example, the first optic modulator and the second optic modulator may each be configured to generate spread spectrum test pulses having a linearly increasing instantaneous frequency function. In some embodiments, the instantaneous frequency of the second test pulse may be a fixed multiple of the first spread spectrum test pulse along the length of the second test pulse. For example, the instantaneous frequency of the second test pulse may be double, or three times, or any other suitable multiple, that of the first spread spectrum test pulse.

Alternatively, in some embodiments, the pulse generator may be configured to generate a spread spectrum pulsed test signal having a non-linearly increasing instantaneous frequency function. For example, the instantaneous frequency function may be a parabolic function, which may have the properties necessary to generate a second complex carrier signal having a linear instantaneous frequency function. In other examples, the instantaneous frequency function may be a hyperbolic function. For example, the pulse generator may comprise an IQ modulator to generate such spread spectrum pulses.

Preferably the pulse generator is configured to transmit a spread spectrum pulsed test signal which is configured to provide a pulse compressed second complex carrier signal with a predetermined side lobe rejection threshold and central lobe width. For example, a sidelobe rejection threshold may be greater than 20 dB, such as greater than 60 dB.

A central lobe width may be less than 3.5 m, for example 2.2 m. For example, the spread spectrum pulsed test signal may have a pulse window defined by a square-root Blackman function to provide a second complex carrier signal having a pulse window defined by a Blackman function. The properties of the square-root Blackman function may thereby be adjusted to provide the predetermined side lobe rejection threshold and central lobe width of the Blackman function associated with the pulse compressed second complex carrier signal. However, any other pulse windows may be used as appropriate. For example, a rectangular pulse window may be used in some examples to achieve a higher spatial resolution. In other embodiments, the spread spectrum pulsed test signal may be configured to provide a second complex carrier signal having a hyperbolic instantaneous frequency function in order to achieve good auto-correlation properties without requiring a window function to be applied to the spread spectrum pulsed test signals or the second complex carrier signal.

The invention includes the combination of the aspects and preferred or optional features described except where such a combination is clearly impermissible or expressly avoided.

BRIEF DESCRIPTION OF THE DRAWINGS

An embodiment of the invention is discussed below in more detail with reference to the accompanying drawings, in which.

DETAILED DESCRIPTION; FURTHER OPTIONS AND PREFERENCES

Distributed Acoustic Sensing System—Optical Time Domain Reflectometer

Figure 1:
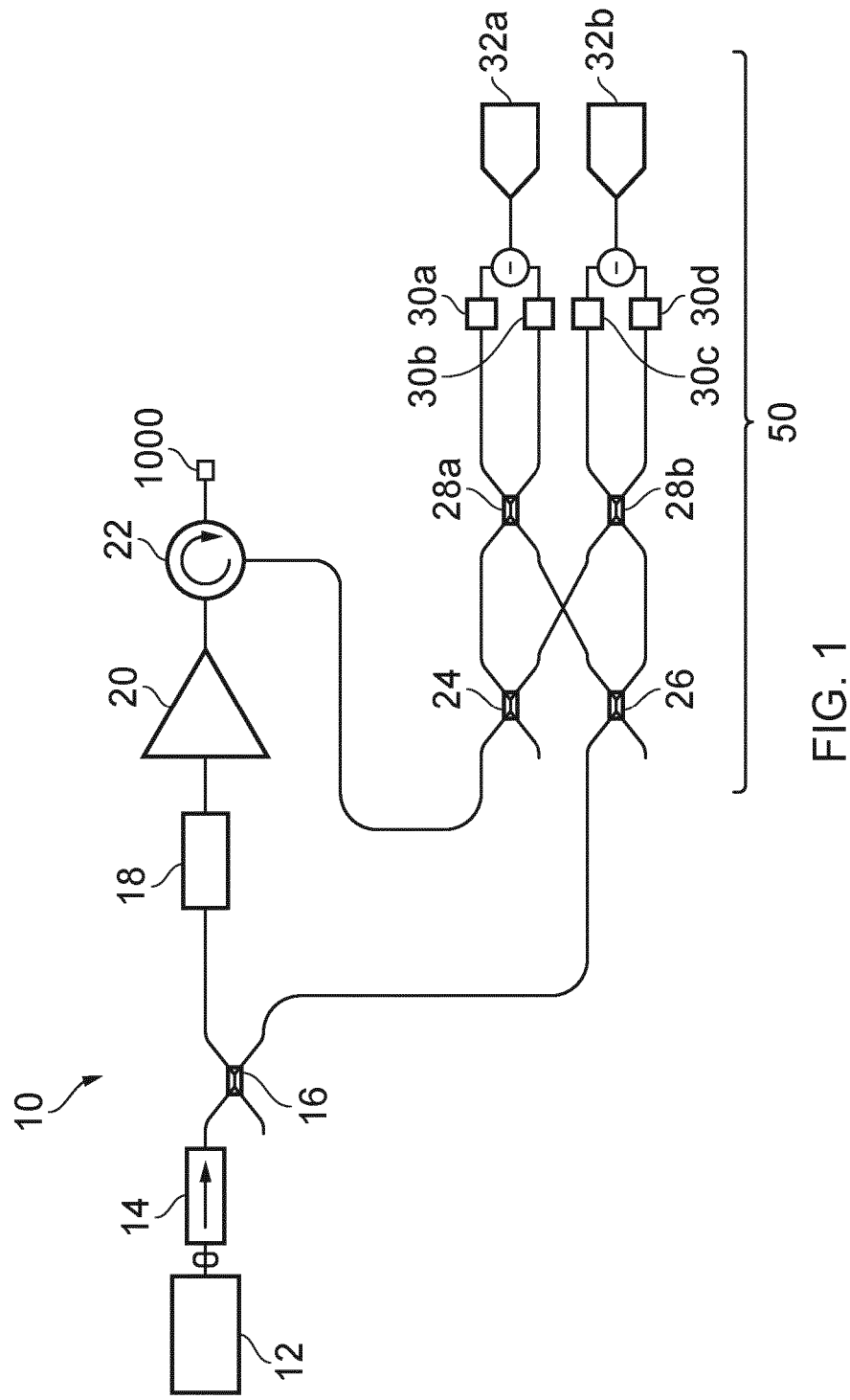
FIG. 1 is a diagram of a conventional local oscillator based optical time domain reflectometer system.

FIG. 1 shows a diagram of a distributed acoustic sensing system in the form of a local oscillator based optical time domain reflectometer (OTDR) system 10. The system 10 is arranged to interrogate an optical path, in particular an optical fiber 1000, which may be of any desirable length for a given purpose.

The system 10 comprises a light source which produces coherent light, which is given here as a laser 12, and is used in continuous wave (CW) operation. The light produced by the laser 12 is directed into an optical isolator 14 to ensure that light is not passed back to the laser 12. After passing through the isolator 14, the light is split into two paths by an optical coupler 16 or beam splitter. The first path, from which light is directed into the fiber 1000 is known as the launch path. The second path, from which light is passed directly to a detection system 50 (discussed below), is known as the local oscillator path. The light is split between the two paths by the optical coupler 16 such that 90% of the incoming light is directed into the launch path, and 10% of the incoming light is directed into the local oscillator path. Of course, the ratio of incoming light directed into each path may be chosen by the operator depending on the nature of the operation for which the OTDR system 10 is used.

The laser light which is directed into the launch path then passes through a pulse generator, such as an acousto-optic modulator (AOM) 18. The AOM 18 is a device which can simultaneously generate an optical pulse as well as upshift or downshift the frequency of light by an amount equal to the radiofrequency which drives the AOM 18. This frequency, F, may be known as the intermediate frequency or the difference frequency. In this way, the AOM 18 is able to generate a pulsed test signal which may be between 5 ns and 100 ns in duration, but not limited to this range. Of course, any preferred method of generating a pulse of light may be used, such as an electro-optic modulator (EOM) or an IQ modulator. The pulsed test signal may also be referred to herein as a launch pulse.

The pulse of light is then amplified using an optical amplifier 20. The amplified light pulse is introduced to the optical fiber 1000 via an optical circulator 22, which has three ports. The amplified light pulse enters the circulator 22 through a first port, where it is passed to a second port in order to enter the optical fiber 1000. As the pulse of light passes through the fiber 1000, a fraction of the light is backscattered from the fiber 1000 by Rayleigh scattering and a further fraction captured and guided back towards the circulator 22. The scattered light, which may be referred to herein as a scattered signal, enters the circulator 22 at the second port, and leaves the circulator 22 to enter a detection stage 50 via a third port.

The detection stage 50 has two inputs. The first input is the scattered laser light from the third port of the circulator 22. The second input is the laser light taken directly from the local oscillator path mentioned above. In a first part of the detection stage 50, the scattered laser light is divided into two paths, for example using a polarising beam splitter (PBS) 24. The PBS 24 splits the scattered light into a horizontally polarised state and a vertically polarised state. The PBS 24 is used as the polarisation of the pulse of light directed through the launch path and also of the scattered light will evolve as a function of distance as it passes through the optical fiber. The PBS 24 therefore ensures polarisation diverse detection, such that a signal is always detected for any polarisation state of light scattered by the optical fiber 1000. The local oscillator (LO) light, which is highly polarised, is also split equally between two paths using a polarisation maintaining optical coupler 26. In other embodiments, the LO signal may be split into two polarisation states in preference to the scattered signal as described.

The scattered light is then mixed with the LO light in each of the horizontal and vertical states at two optical couplers 28a, 28b. The light from each output of the optical couplers 28a, 28b is then allowed to interfere on a square law detector 30a, 30b, 30c, 30d. The difference of the signal from each detector pair 30a and 30b, 30c and 30d is then taken and measured at an analog-digital-converter 32a, 32b.

The system 10 described above makes use of a heterodyne sensing approach, wherein the frequency of the local oscillator and of the launch pulse are shifted relative to one another by the AOM 18. The difference in these two frequencies should be larger than the bandwidth required to represent the scattering without allowing crosstalk between the carrier and the DC terms which are also generated (see below), allowing the phase and amplitude information of the scattering to be recovered using a real carrier. Another method employs a complex carrier detection stage, replicating the polarisation diverse detection stage for two copies of the local oscillator shifted by 90 degrees relative to each other. This allows detection via a complex carrier, allowing either the positive sidelobe or the negative sidelobe of the resulting interference signal to be recovered independently. This allows homodyne operation whereby the local oscillator signal and launch pulse operate at the same optical frequency.

Figure 2:
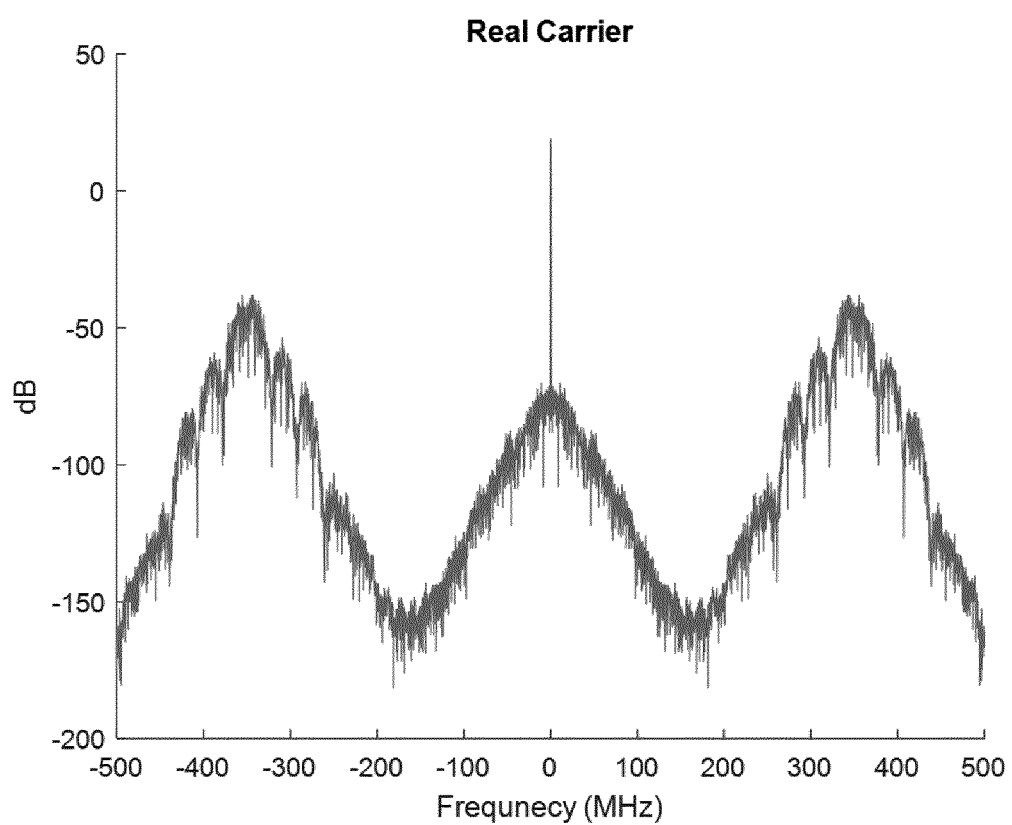
FIG. 2 shows the frequency domain of a simulated detector trace for a local oscillator based optical time domain reflectometer system as shown in FIG. 1.

FIG. 2 is a simulated detector trace showing the detection spectrum for a local oscillator based optical time domain reflectometer system implemented with heterodyne coherent detected, as discussed above with respect to FIG. 1. In the depicted example, the difference frequency between the local oscillator and the launch path pulse is 350 MHz. A treatment of the interference of two waves is given below, and the resulting terms are distinguishable in the simulated detector trace of FIG. 2. Note that for illustrative purposes a noise contribution is not included in the spectrum of FIG. 2.

A treatment of the interference of two waves for the system shown in FIG. 1 is shown below.

$$E_S = \frac{1}{2} E_{Sn} \left( e^{i(\phi_{sn}(t) - \omega_s t)} + e^{-i(\phi_{sn}(t) - \omega_s t)} \right) \quad (1)$$

Equation (1) shows the E-field resulting from scattering within the optical fiber at a position n, with phase $\phi_{sn}$ and frequency $\omega_s$.

$$E_{LO} = \frac{1}{2} E_{LOn} \left( e^{i(\phi_{LOn}(t) - \omega_{LO} t)} + e^{-i(\phi_{LOn}(t) - \omega_{LO} t)} \right) \quad (2)$$

Equation (2) shows the E-field of the local oscillator at a position n, with phase $\phi_{Lon}$ and frequency $\omega_{LO}$.

When these two waves interfere, and are observed by a square law detector, the resulting intensity is given by equation (3), below:

$$I_{Det} = (E_S + E_{LO}) \cdot (E_S + E_{LO})^* \quad (3)$$

This can be expanded and simplified to:

$$I_{Det} = \frac{1}{4} |E_s|^2 + \frac{1}{4} |E_{LO}|^2 +$$

-continued $$\frac{1}{4}|E_s||E_{LO}|\left[e^{i(\phi_{sn}(t)-\phi_{LOn}(t)-(\omega_s-\omega_{LO})t)} + e^{-i(\phi_{sn}(t)-\phi_{LOn}(t)-(\omega_s-\omega_{LO})t)} + \right.$$

$$\left. e^{i(\phi_{sn}(t)+\phi_{LOn}(t)-(\omega_s+\omega_{LO})t)} + e^{-i(\phi_{sn}(t)+\phi_{LOn}(t)-(\omega_s-\omega_{LO})t)}\right]$$

It can be seen that this generates a DC term related to the scattered light intensity; a DC term related to the local oscillator intensity; a negative frequency term which is centred at the difference frequency between the local oscillator and scattered light waves; and a positive frequency term which is centred at the difference frequency between the local oscillator and scattered light waves. The positive and negative frequency terms also carry information about the phase difference between the local oscillator and scattered light waves at a time, t. As a result, it is only necessary to analyse one of the positive or negative frequency terms in order to recover the phase and amplitude information, e.g. by analysing either one of the two sidebands shown in FIG. 2.

In order to recover information relating to the phase and amplitude of the signal, the signal typically undergoes digital down conversion to recover only the positive frequency term, followed by rectangular to polar coordinate transformation yielding the instantaneous phase and amplitude of the signal as a function of time. This process is equivalent to a complex multiplication and has the effect of shifting the positive frequency term, or carrier, down to DC and then filtering the signal to remove what was the DC terms and the negative frequency term. That is, the recovered signal is around the positive frequency peak shown on the right hand side of FIG. 2. At this stage since the wanted bandwidth and hence the bandwidth of the low pass filter is less than the carrier frequency, there is in effect a complex carrier at baseband, centred at 0 Hz. The in-phase and quadrature components are then passed to a rectangular-to-polar coordinate transform, yielding the instantaneous phase and amplitude of the carrier as a function of time.

As demonstrated by Equation (3), the performance of this system is limited by the amount of energy in each measurement, that is, in each pulse. In addition, the noise in the detection system is limited by the shot noise generated by the local oscillator, which is fundamental and cannot be reduced by traditional methods. However, the maximum power of the launch pulse is limited due to the onset of detrimental non-linear effects that degrade the properties of the pulse as it propagates. Therefore, the simplest way to increase the performance of the system is to increase the length/duration of the launch pulse. This increases the energy per measurement but reduces the spatial bandwidth available and hence reduces the spatial resolution of the system.

The inventors have identified that spread spectrum techniques offer the advantages of a longer pulse, increasing the signal-to-noise ratio and improving the operational range of the optical detection system without an associated reduction in spatial resolution. How such spread spectrum techniques can be applied to a distributed acoustic sensing system is discussed in more detail below.

Application to Digital Acoustic Sensing

A DAS system measures the acoustic field, i.e. vibrations, along a distributed length of optical fiber forming a transducer. The acoustic field is typically regarded as a modulating strain field with variations occurring in the acoustic frequency band. The DAS system can therefore measure small changes in the length of the optical fiber. Since strain acting on an optical fiber has the effect of both modulating the length of the fiber and its refractive index, the phase of scattered light is a direct measure of the optical path experienced by the probing pulse of light launched into the fiber. However, there is also the added complexity of the scattering phase at each point. It is therefore necessary to measure the change in optical phase over a given measurement gauge length to account for the effect of the scattering phase. The coherent detection method yields a result which is a cumulative phase difference acquired over the entire length of the optical fiber up to the point at which the probing pulse is backscattered towards the detector. To obtain an instantaneous phase difference rather than the cumulative phase, it is therefore necessary to calculate the difference in phase over the decided gauge length. In particular, the difference in phase between two locations, n and n+1, can be calculated by taking a spatial differential along the length of the fiber, as shown by equation 4.

$$(\phi_{s(n+1)} - \phi_{LO(n+1)}) - (\phi_{sn} - \phi_{LOn}) \qquad (4)$$

As the term $(\phi_{LOn}-\phi_{LO(n+1)})$ is constant throughout the local oscillator signal, equation 4 can be used to determine the spatial differential of the scattered modulated phase along the length of the fiber. The advantage of this method that the measurement gauge length (i.e. the difference between positions n and n+1) can be decided after data acquisition. After the spatial differential is taken a series of phase data for each location is obtained which represents the optical path difference over the given spatial gauge at each location along the fiber. The phase from each location can then be unwrapped and the acoustic signal at each location can be plotted and output. This method of signal processing and phase recovery is known as 'phase domain processing'.

As noted above, a polarisation diverse detection system is used as the polarisation state of the scatter evolves with distance, and hence some locations may yield no carrier signal whatsoever as the LO and scatter field may be cross polarised. In situations like this the orthogonal channel however should yield a strong signal. It is therefore necessary to combine the response from both polarisation channels. However, since the scatter field for each polarisation state will effectively be independent, the absolute phase of the signals generated from each polarisation channel will be different and thus combination is difficult. Typically the two channels are combined in the phase domain around an average DC phase weighted by the signal-to-noise ratio or power spectral density of the signal yielded for each location.

'Phase domain processing' does, however, lead to problems for DAS systems. In particular, the rectangular-to-polar (R-P) coordinate conversion step has non-linear performance in the presence of noise, and the spatial differential of phase in this method can only be performed after the R-P coordinate conversion.

As the length of the optical fiber increases, the level of the returned scatter signal reduces due to the losses of the optical fiber. The noise bandwidth of the R-P coordinate conversion is set by the pulse repetition frequency (PRF) and at some point the level of the scatter signal reduces to a level where the noise in band approaches the non-linear threshold of the R-P coordinate converter.

Typically the PRF is of the order of kHz but the target acoustic frequency range is perhaps a few 100 Hz. One known improvement is to reduce the demodulation bandwidth prior to the R-P coordinate converter, which reduces the noise in-band and hence allows operation down to lower signal-to-noise ratios than are possible without limiting the demodulation bandwidth. However, this creates an additional problem in that the phase response prior to spatial differential is a cumulative phase picked up from the fiber up to the scattering point and the effects of reduced demodulation bandwidth needs to be accounted for. If the rate of change of phase exceeds the demodulation bandwidth, either due to its frequency or its amplitude, then 'overscale' occurs, i.e. where the system can no longer track the phase and a phase jump occurs. Since the system is tracking the cumulative phase up to the point of scattering, as larger distances along the optical fiber are considered the probability that the cumulative phase will overscale increases. Over the long fiber length which is used for typical applications the probability of cumulative phase overscale is almost certain. If, however, the demodulation bandwidth is left at Nyquist (i.e. the intrinsic limit from the PRF) then the distortion components mirror from Nyquist and even in the presence of cumulative overscale a spatial differential is valid and the true spatial differential of phase can be recovered. This leads to an effective range and/or spatial resolution limitation when the phase domain processing is used.

If, however, the demodulation bandwidth is reduced, information required to create a valid spatial differential is fundamentally lost and this leads to cumulative overscale, effectively destroying downstream information required for the spatial differential to remain valid. Again, this results in a range and/or spatial resolution limitation for the phase domain processing.

As the use of a spread spectrum pulse allows the operational range of the optical detection system to be increased, as discussed above, the issues which arise as a result of cumulative phase modulation and overscale become more pertinent. Additionally, over an extended length of fiber there is likely to be a section where the phase modulation depths experienced by the pulse are very large. The large phase change directly modulates the 'chirp' of the probe pulse (the change in the instantaneous frequency of the pulse over its length) as well as the pulse envelope. These effects become more noticeable as the length of the spread spectrum pulse increases. In addition, these problems are not be addressed by pulse compression in a cumulative phase domain.

The present invention aims to overcome the problems that occur with these known processing methods.

Figure 3:
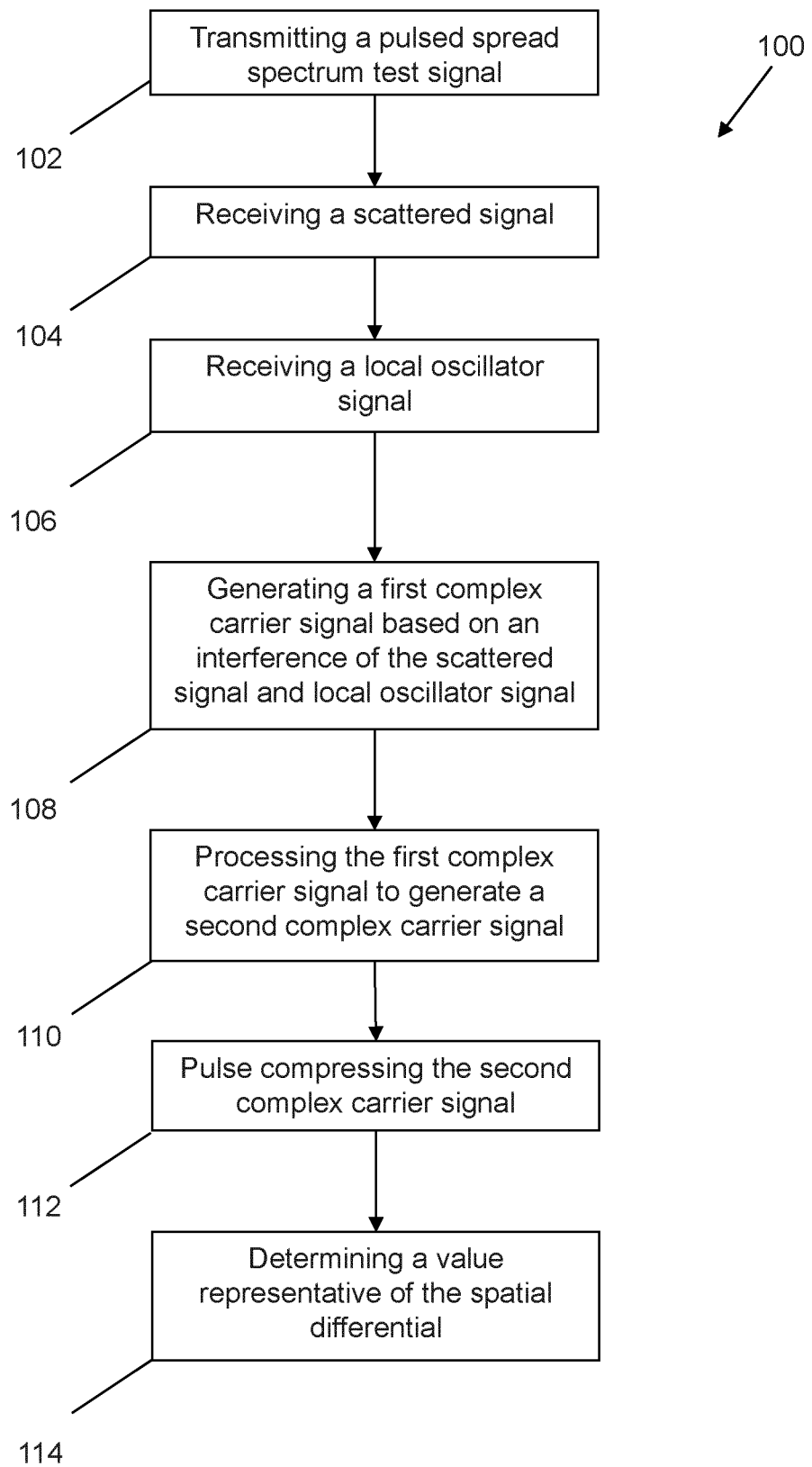
FIG. 3 is a flow chart of a signal processing method which may be used with embodiments of the present invention.

A flow chart of a signal processing method 100 for an optical detection stage according to an embodiment of the present invention is shown in FIG. 3. Preferably, the signal processing method 100 may make use of an optical time domain reflectometer such as that shown in FIG. 1, though the detection stage and the pulse launch stage may be altered as required to work with the processing method 100 described herein. The steps of the method may be carried out by a controller of the system having appropriate software installed thereon.

In a first step 102, the method 100 comprises transmitting, with a coherent light source such as a laser, a pulsed spread spectrum test signal along an optical path, such as the optical fiber 1000. For example, the spread spectrum test signal may be sent as one or more pulses. Preferably, the coherent light source may operate in a continuous wave mode, wherein the continuous wave may be pulsed, for example using an acousto-optic modulator (AOM) generally as described above with respect to FIG. 1. In particular, the optical path may be an optical fiber such that vibrations of the optical fiber may be detected using the method described herein. For example, an AOM or other modulator may be used to generate single or multiple pulses which interrogate the fiber under test at a given time. The AOM, or other pulse modulator, may define the pulse shape and the spectral content of the pulse, i.e. the pulse modulator may chirp the pulse to modify the instantaneous frequency of the pulse throughout its length, for example by upshifting or by downshifting the instantaneous frequency. In some embodiments, the pulse modulator may be configured to generate multiple pulses which interrogate the optical path at the same time, as will be described in more detail below. In some embodiments the pulse may be linearly chirped or may be non-linearly (e.g. parabolically) chirped. Parabolic chirping of the pulse may require the AOM to be replaced by an IQ modulator, which may allow both amplitude and frequency modulation.

In a second step 104, the method 100 comprises receiving a scattered signal that was scattered at a location along the optical path. Preferably, the signal may be received at a detector stage, such a detection stage of an OTDR. A local oscillator signal is also received by the detector stage at step 106. For example, the detector stage may be a detector stage 50 as described above.

When the scattered signal and the local oscillator signal are received, the method 100 comprises generating, based on interference of the scattered signal and the local oscillator signal, a first complex carrier signal that is modulated by a phase difference between the local oscillator signal and the scattered signal, at step 108. The first complex carrier signal is then processed to generate a second complex carrier signal that is modulated by a spatial differential of the phase difference, the spatial differential being taken along a chosen length of the optical path. This is shown in step 110. The second complex carrier signal is itself a spread spectrum signal and it will be appreciated that the properties of the second complex carrier signal may be modified to achieve predetermined sensing results (e.g. predetermined side lobe rejection and/or central lobe width) by modifying properties of the pulsed spread spectrum test signal, for example according to embodiments of the invention described herein.

For example, the first complex carrier signal may be processed to generate the second complex carrier signal by multiplying a complex conjugate of the first complex carrier signal with a delayed copy of itself (delayed by the chosen gauge delay).

In another embodiment, step 110 may comprise digitally simulating interference of the first complex carrier signal with a delayed copy of itself. Such digital simulation may comprise generating a copy of the first complex carrier signal, wherein a frequency shift is introduced between the first complex carrier signal and the copy of the first complex carrier signal, and wherein the copy of the first complex carrier signal is delayed relative to the first complex carrier signal; adding the first complex carrier signal and the copy of the first complex carrier signal together to produce a summed complex carrier signal; and multiplying the summed complex carrier signal with a complex conjugate of the summed complex carrier signal, to generate the second complex carrier signal. Preferably, this frequency shift is larger than a bandwidth required to adequately represent scattering of the test signal along the optical path whilst avoiding crosstalk with the DC baseband signal. For example, where the optical path is an optical fiber such as in an OTDR system, the scattering may be Rayleigh scattering.

As the original test signal is a spread spectrum pulse, which may be a longer pulse than is typically used and so allow sensing over a larger distance as explained above, the scattered signal as well as the first complex carrier signal and second complex carrier signal encode the scatter from a much wider range of distances. In particular, the second complex carrier signal is also itself a spread spectrum signal. To recover this information, a step of 'pulse compression' is performed on the second complex carrier signal at step 112. By performing pulse compression on the second complex carrier signal, which is itself also spread spectrum signal and which carries the spatial differential of phase due to processing of the first complex carrier, it can be ensured that it is the information relating to the spatial differential of phase, not the cumulative phase, which is recovered. The pulse compression step 112 involves correlating the second complex carrier signal with a reference or kernel signal, wherein the reference signal is a time-reversed complex conjugate of the second complex carrier signal, as explained in more detail below. Pulse compressing the second complex carrier signal at step 112 in this way provides a much high spatial resolution for the sensing system with a higher signal-to-noise ratio than is achievable using a non-spread pulse.

The kernel signal which the second complex carrier signal is correlated with is dependent on the properties of the second complex carrier signal and therefore also of the original test signal. For example, when the pulsed spread spectrum test signal comprises two spread spectrum pulses, the instantaneous frequency function of the second complex carrier signal is related to the difference between the instantaneous frequency function of the two spread spectrum pulses. When the pulsed spread spectrum test signal comprises a parabolically chirped pulse, the instantaneous frequency function of the second complex carrier signal is related to the change in instantaneous frequency when differentiated over the gauge length.

Finally, the method 100 comprises, at step 114, determining, based on the pulse-compressed second complex carrier signal, a value representative of the spatial differential of the phase difference for the location along the optical path. For example, the pulse-compressed second complex carrier signal can be passed to a rectangular-to-polar (RP) coordinate transform, or a vector stacking method may be used to determine a value representative of the spatial differential as described in GB 2588177 A. Any appropriate method can be used to determine a value representative of the spatial differential from the pulse compressed second complex carrier signal.

In this way, the method 100 provides a carrier signal, the pulse-compressed second complex carrier, which can passed to a rectangular to polar coordinate transform, wherein the pulse-compressed second complex carrier signal carries not the cumulative phase of scatter as in known methods but instead carries the spatial differential of phase prior to performing R-P conversion. In this way, the problems associated with cumulative phase modulation on a spread spectrum system can be avoided, which allows operation with a reduced demodulation bandwidth and an extended DAS system range. In some embodiments, prior to rectangular-to-polar coordinate transformation, the method 100 may comprise a step of passing the pulse-compressed second complex carrier signal through a digital down conversion stage.

A first example of a spread spectrum digital acoustic sensing (DAS) system utilises two spread spectrum pulses to interrogate the fiber under test. The system may be largely as shown in FIG. 1. However, in one example the AOM 18 is configured to generate two pulses which are launched into the fiber 1000. A second pulse is delayed relative to the first pulse by a time equating to the required gauge-length. The instantaneous frequency of each pulse is also tailored, such that the first pulse is chirped from a first frequency, F1, to a second frequency, F2, and the second pulse is chirped from a third frequency, F3, to a fourth frequency, F4. In this example, the instantaneous frequency of each of the pulses increases linearly over the duration of the pulse. The pulses are preferably generated having a square-root Blackman function envelope, as this provides greater side lobe rejection during processing of the scattered signal, as discussed in more detail below. Of course, other envelope functions may be chosen to provide desired properties. For example, a rectangular windowed pulse, or square-root rectangular window (e.g. sine window), may be used in some embodiments to give an improved spatial resolution, with a narrower central lobe width after pulse compressing the second complex carrier signal as explained below.

Figure 4:
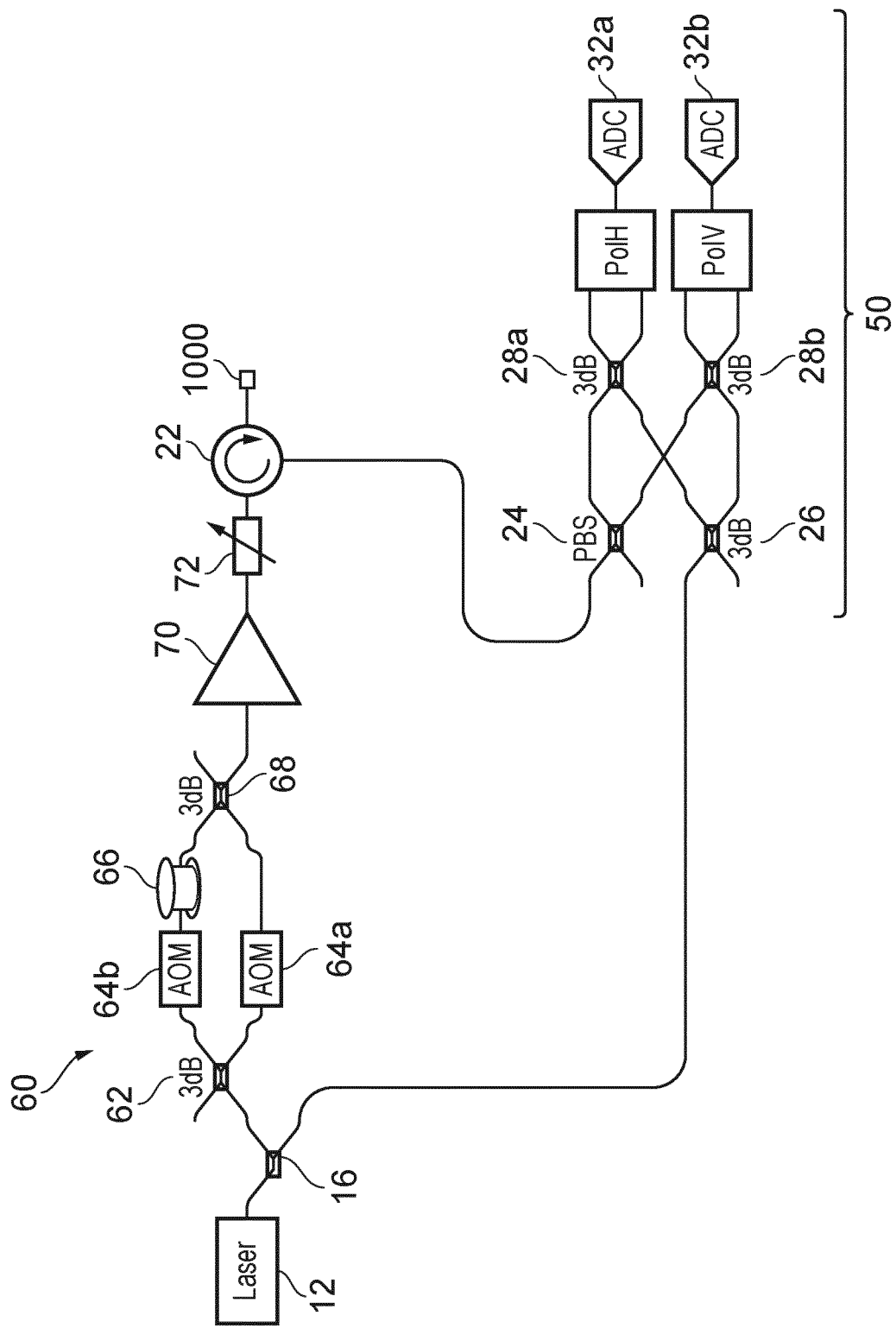
FIG. 4 is a diagram of distributed acoustic sensing (DAS) system according to an embodiment of the present invention.
Figure 5A:
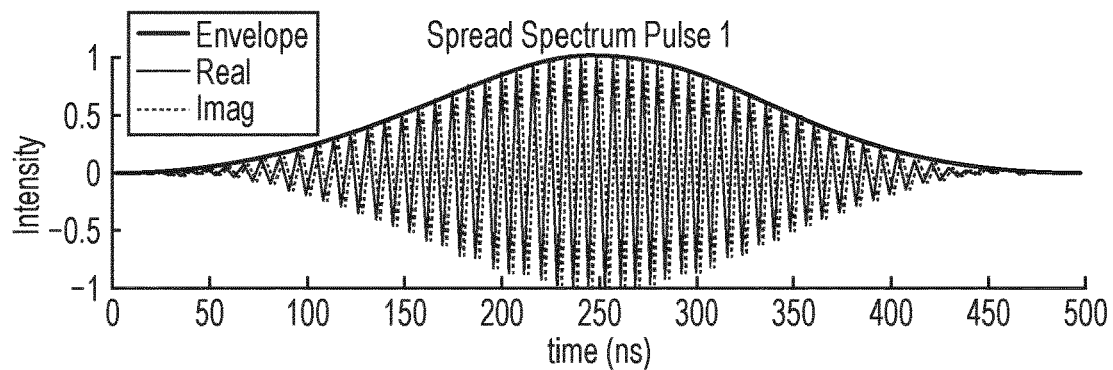
FIGS. 5(*a*)-5(*d*) shows a series of graphs relating to two spread spectrum pulses.
Figure 5B:
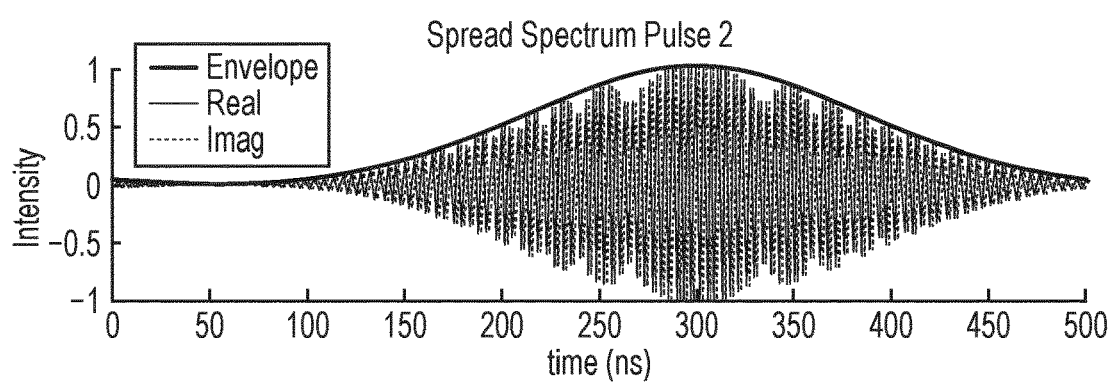
Figure 5C:
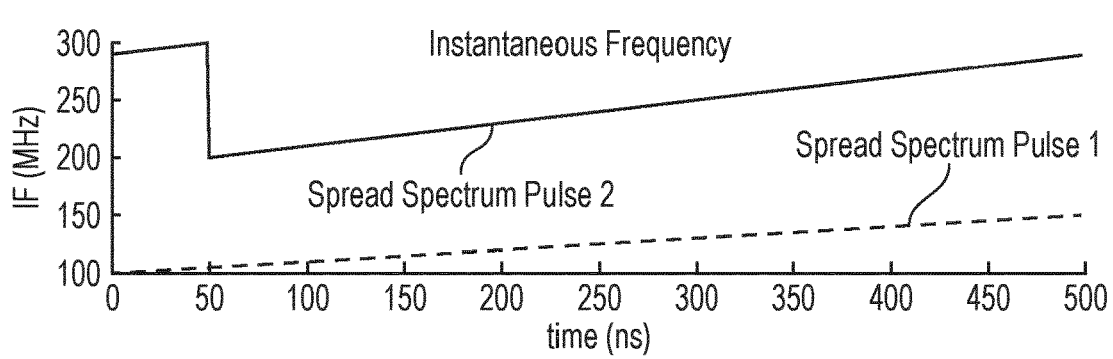
Figure 5D:
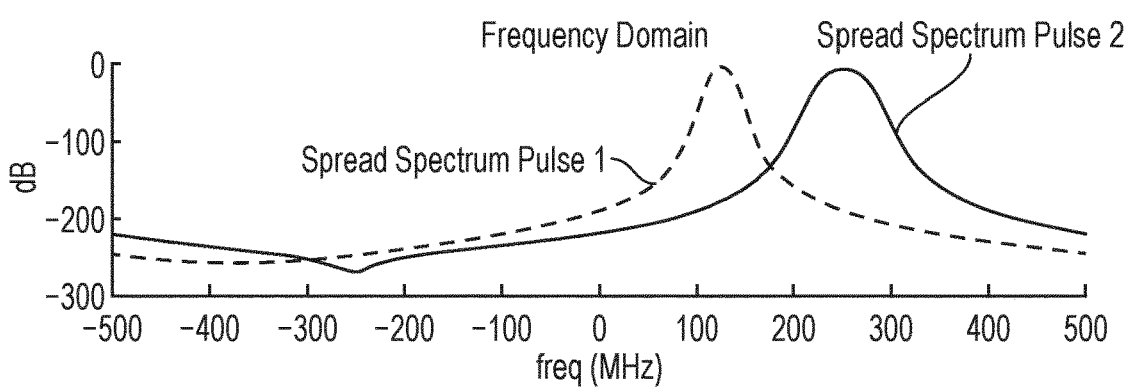

FIG. 4 is a diagram of a DAS system 60 according to an embodiment of the present invention. The system 60 comprises similar features as the system 10 discussed above with respect to FIG. 1, such that corresponding features are given corresponding references numerals and further discussion of which is not repeated. However, the DAS system 60 shown in FIG. 4 has alternative adaptations configured to produce two spread spectrum pulses as required for DAS system in one embodiment of the present invention.

Laser light directed into the launch path by an optical coupler 16 is further split between two paths by an additional optical coupler 62. Preferably 50% of the light is directed into each of these two paths by the coupler 62. Laser light on each of these two paths passes through an acousto-optic modulator (AOM) 64a, 64b which upshift or downshift the frequency of light as well as introducing a chirp which changes the instantaneous frequency of each light pulse as discussed herein. For example, in a first path the AOM 64a produces a chirped pulse of light which has an instantaneous frequency which increases from a first frequency, F1, to a second frequency, F2. In a second path the AOM 64b produces a chirped pulse of light which has an instantaneous frequency which increases from a first frequency, F3, to a second frequency, F4. In this example, the instantaneous frequency of each of the pulses increases linearly over the duration of the pulse, but it will be appreciated that in other examples at least one of the pulses may have a non-linear instantaneous frequency function. For example, the instantaneous frequency function of at least one of the pulses may be a parabolic or hyperbolic function. The pulses are preferably generated having a square-root Blackman envelope, as this provides greater side lobe rejection during processing of the scattered signal, as discussed in more detail below. Of course, other envelope functions may be chosen to provide desired properties. For example, a rectangular enveloped pulse may be preferred in some embodiments to give an improved spatial resolution. However, it will be appreciated that in some examples a pulse envelope or window may not be required, for example where the spread spectrum test pulses are configured to generate a second complex carrier signal having a hyperbolic instantaneous frequency function.

After passing through the AOM 64b, the second spread spectrum pulse passes through a delay line 66 which introduces a time delay to the second spread spectrum pulse in comparison with the first spread spectrum pulse produced by the AOM 64a. Any suitable method of introducing a time delay to the second spread spectrum pulse may be used. In particular, the second spread spectrum pulse is delayed relative to the first spread spectrum pulse by an amount equal to the required gauge length. The delay line 66 may therefore be adjustable in some embodiments to allow an operator of the system to adjust the gauge length as required.

The first spread spectrum pulse and the second spread spectrum pulse are then recombined into a single test signal by an optical coupler 68. Before being launched into the fiber under test 1000, the test pulse is amplified using an optical amplifier 70 and passes through an optical isolator 72 to ensure that light does not re-enter the launch path from the circulator 22. The pulse test signal, comprising a first spread spectrum pulse and a second spread spectrum pulse, then interrogates the fiber under test 1000 before being analysed according to the methods described herein.

FIG. 5 shows a series of graphs relating to two example spread spectrum pulses which may be used in a first example of a spread spectrum DAS system as discussed above. FIG. 5(*a*) shows the intensity of a first spread spectrum pulse, spread spectrum pulse 1 over time. FIG. 5(*b*) shows the intensity of a second spread spectrum pulse, spread spectrum pulse 2, over time. FIGS. 5(*a*) and 5(*b*) demonstrate that spread spectrum pulse 2 is delayed with respect to spread spectrum pulse 1 by around 50 ns. FIG. 5(*c*) shows the instantaneous frequency of each pulse with time. In particular, spread spectrum pulse 1 has a first frequency, F1, of 100 MHz and a second frequency, F2, of 150 MHZ; spread spectrum pulse 2 has a third frequency, F3, of 50 MHz and a fourth frequency, F4, of 250 MHz. That is, the instantaneous frequency of spread spectrum pulse 2 is always double that of spread spectrum pulse 1. FIG. 5(*d*) is a graph showing the frequency domain of spread spectrum pulse 1 and spread spectrum pulse 2, showing that spread spectrum pulse 1 is centred on 125 MHz with a modulation bandwidth of 50 MHz and spread spectrum pulse 2 is centred on 250 MHz with a modulation bandwidth of 100 MHz. In other embodiments, the instantaneous frequency of a second spread spectrum pulse may be any suitable multiple of the instantaneous frequency of a first spread spectrum pulse. By providing a first spread spectrum pulse and a second spread spectrum pulse in this way, it can be ensured that a second complex carrier signal, which is generated in a manner as described below, is itself a spread spectrum carrier with a linear instantaneous frequency function. Of course, it will be appreciated that any suitable instantaneous frequency function of a first spread spectrum pulse and of a second spread spectrum pulse may be selected to achieve this result. For example, the instantaneous frequency functions may be non-linear functions with a constant factor between the instantaneous frequency function of the first spread spectrum pulse and the instantaneous frequency function of the second spread spectrum pulse.

For example, if a first spread spectrum pulse has a chirp rate of n Hz/s and a second spread spectrum pulse has a chirp rate of m Hz/s, then following the processing steps described herein will give a second complex carrier signal having a chirp rate of |n−m| Hz/s.

Figure 6:
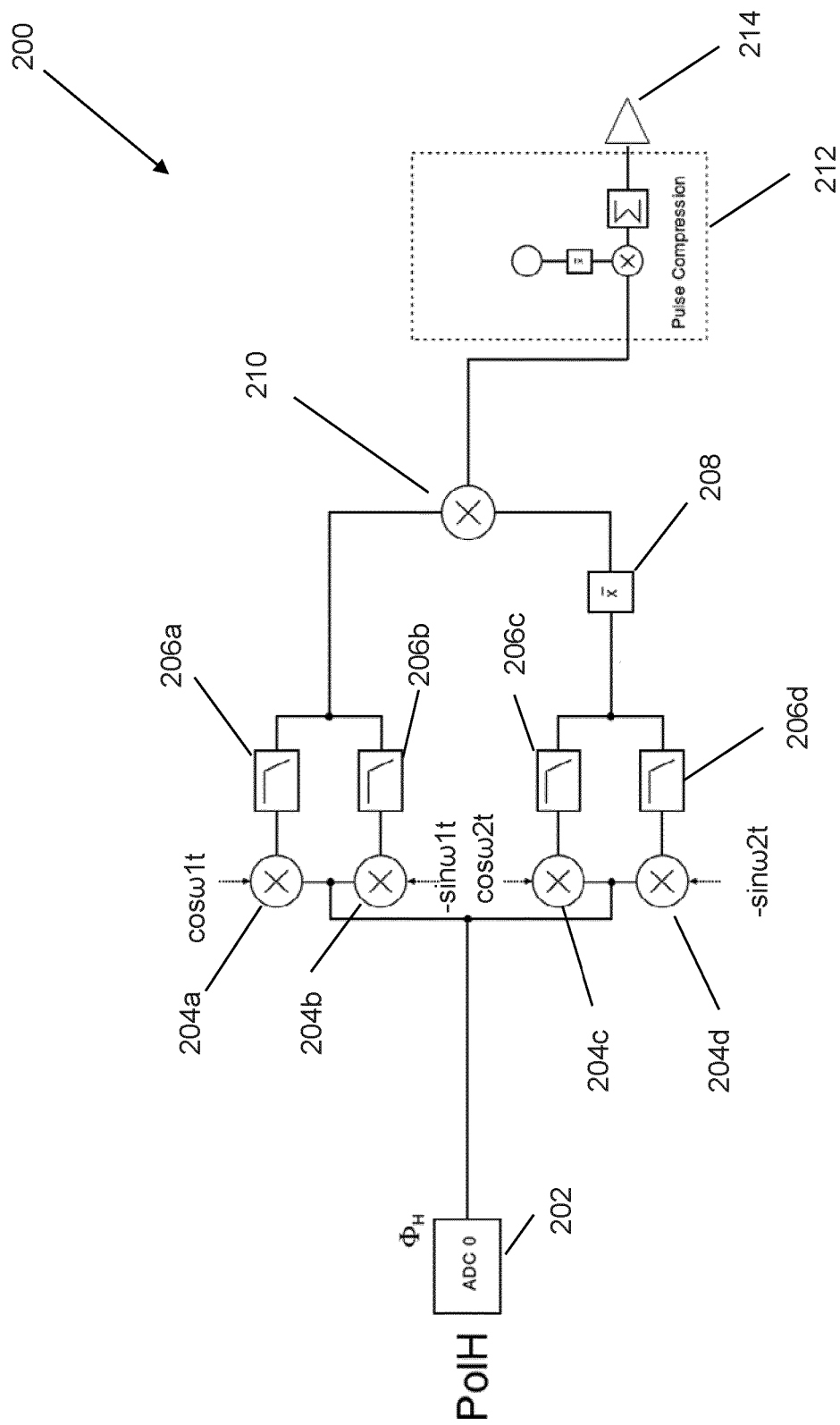
FIG. 6 is a schematic diagram showing a portion of a signal processing method according to an embodiment of the present invention.

FIG. 6 is a schematic diagram showing a portion of a signal processing method according to an embodiment of the present invention for a DAS system which utilises two spread spectrum pulses, such as the two spread spectrum pulses described above with respect to FIG. 5.

The signal processing diagram 200 starts with a real carrier signal which is output from an analog-to-digital converter (ADC) 202. FIG. 6 shows the signal processing diagram 200 for a horizontal polarization branch of a polarization diverse detector as discussed above with respect to FIG. 1. It will be appreciated that similar processing also occurs for a vertical polarization branch of the system, which is omitted here for clarity.

In this method, the test signal includes a first spread spectrum pulse and a second spread spectrum pulse, as discussed above with respect to FIG. 5, wherein the second spread spectrum pulse is delayed relative to the first spread spectrum pulse, and the two pulses each have different frequencies and instantaneous frequency functions. As a result, the ADC 202 may be configured to output a signal representative of the interference between a scatter signal that was scattered from a location along an optical path and a local oscillator signal for each of the two spread spectrum pulses. The output signal of the ADC 202, the real carrier signal, is then divided such that the signal which results from each test pulse is processed separately before being multiplied together at a later stage, as will be described below.

Considering the first spread spectrum pulse, the output signal of the ADC 202, the real carrier signal, is split into two parts with one part being multiplied by an in-phase component (cos $\omega_1 t$, where $\omega_1 = \pi(F2+F1)$ for the pulses described above with respect to FIG. 4) 204*a* and one part being multiplied by a quadrature component (sin $\omega_1 t$) 204*b*. Each of these parts is then passed through a lowpass filter 206*a*, 206*b* to remove the unwanted terms and the outputs of the lowpass filters 206*a*, 206*b* are recombined into a complex signal. This process may be referred to as digital down conversion (DDC). The recombined signal is a first complex carrier signal for the first spread spectrum pulse, similar to the first complex carrier signal generated in step 108 of the method 100 discussed above, which is modulated by a phase difference between the local oscillator signal and the scattered signal. At this point, the first complex carrier signal shows the cumulative phase acquired by the scatter signal from the first spread spectrum pulse.

This process of digital down conversion is repeated for the second spread spectrum pulse, though an additional step of complex conjugation 208 is performed on the second spread spectrum pulse. The output signal of the ADC 202 for the second spread spectrum pulse is split into two parts with one part being multiplied by an in-phase component (cos $\omega_2 t$, where $\omega_2 = \pi(F3+F4)$ for the pulses described above with respect to FIG. 4) 204*c* and one part being multiplied by a quadrature component (−sin $\omega_2 t$) 204*d*. Each of these parts is then passed through a lowpass filter 206*c*, 206*d* to remove the unwanted terms and the outputs of the lowpass filters 206*c*, 206*d* are recombined into a complex signal. This recombined signal is a first complex carrier signal for the second spread spectrum pulse. A step of complex conjugation 208 is then performed on this first complex carrier signal for the second spread spectrum pulse.

The first complex carrier signal for the first spectrum pulse and the conjugate of the first complex carrier signal for the second spread signal pulse are then multiplied 210. This generates a digitally synthesised spread spectrum pulse in the spatial differential domain, i.e. a second complex carrier signal that carries the spatial differential of phase similar to the second complex carrier signal generated in step 110 of the method 100 discussed above. As the original first spread spectrum pulse and second spread spectrum pulse had different instantaneous frequency functions as described above, the second complex carrier signal is also a spread spectrum signal. However, this spread spectrum second complex carrier signal contains information relating to the spatial differential of phase rather than cumulative phase, and so the problems associated with cumulative phase modulation can be avoided when recovering the phase information. Graphs relating to this second complex carrier signal are shown in FIG. 7, which are generated based on the two pulses shown in FIG. 5.

The digitally synthesised spread spectrum pulse, the second complex carrier signal, undergoes pulse compression 212. The second complex carrier signal is correlated with a reference or kernel signal, which is a time-reversed complex conjugate of the instantaneous frequency function of the second complex carrier signal.

At step 214 the pulse-compressed complex carrier signal is passed on for further processing into order to determine a value representative of the spatial differential of the phase different for the location along the optical path. For example, the pulse-compressed second complex carrier signal can be passed to a rectangular-to-polar (RP) coordinate transform, or a vector stacking method may be used to determine a value representative of the spatial differential, as described in GB 2588177 A. Any appropriate method can be used to determine a value representative of the spatial differential from the pulse compressed second complex carrier signal in this way.

Figure 7:
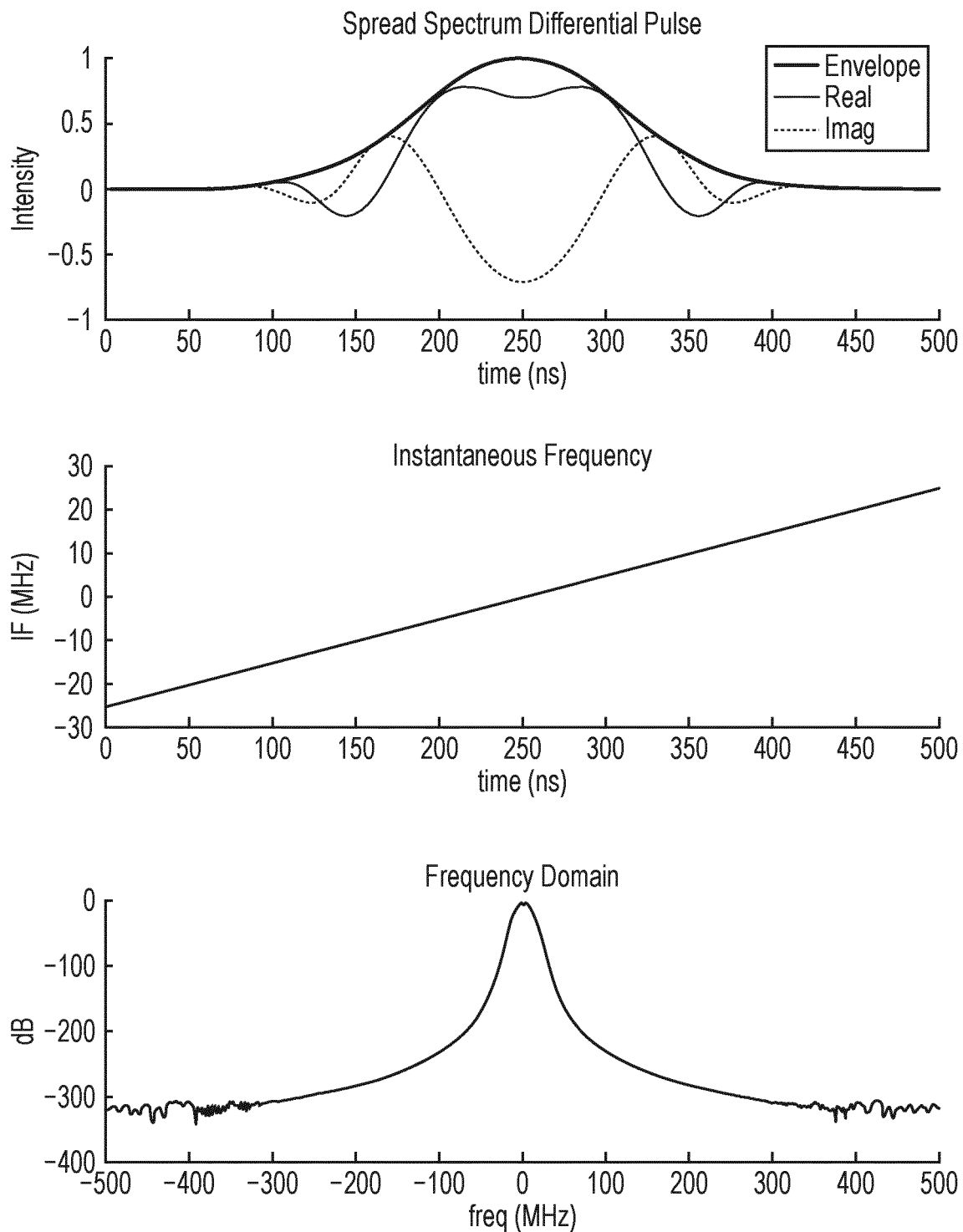
FIG. 7 shows a series of graphs relating to a second complex carrier signal.

FIG. 7 shows an example of a second complex carrier signal, generated according to the method described above with respect to FIG. 6 based on a first spread spectrum pulse and a second spread spectrum pulse as described above with respect to FIG. 5. The second complex carrier signal contains information relating to the spatial differential of phase, rather than a cumulative phase. The modulation bandwidth of the second complex carrier is equal to the difference between the modulation bandwidths of the first spread spectrum pulse and the second spread spectrum pulse. In this example, where the first spread spectrum pulse has a modulation bandwidth of 50 MHz and the second spread spectrum pulse has a modulation bandwidth of 100 MHz as shown in FIG. 5, the second complex carrier signal has a modulation bandwidth of 50 MHz as shown in the lower graph of FIG. 7 ("Frequency Domain"). It should also be noted that the pulse envelope of the second complex carrier signal, shown in the upper graph of FIG. 7 ("Spread Spectrum Differential Pulse") is the product of the pulse envelopes of the first spread spectrum pulse and the second spread spectrum pulse. As discussed above with respect to FIGS. 5 to 7, embodiments of the present invention may be implemented with multiple pulses, wherein the instantaneous frequency of the pulses increases linearly. However, it is also envisaged that embodiments of the present invention may utilise one or more spread spectrum pulses wherein the instantaneous frequency of the pulse or pulses changes non-linearly. For example, by utilising spread spectrum pulses with a non-linear instantaneous frequency function the second complex carrier signal may also have a non-linear instantaneous frequency function and so this can be used to account for doppler effects in some applications. For example, the second complex carrier signal may be provided with a hyperbolic instantaneous frequency function by appropriate configuration of first and second spread spectrum pulsed test signals.

A second example of a spread spectrum DAS system utilises a single spread spectrum pulse to interrogate the fiber under test. The system may be largely as shown in FIG. 1. However, in this example the AOM 18 is configured to generate a single pulse which is launched into the fiber 1000. Alternatively, an IQ modulator may be used in place of the AOM 18, and may be used to generate a spread spectrum pulse wherein the instantaneous frequency of the pulse increases parabolically from a first frequency to a second frequency. The pulse is preferably generated having a square-root Blackman envelope, as this provides greater side lobe rejection during processing of the scattered signal, as discussed in more detail below. Of course, other envelope functions may be chosen to provide desired properties. For example, a rectangular enveloped pulse may be preferred in some embodiments to give an improved spatial resolution. In other examples, the single spread spectrum pulse may not have a window function, for example where the spread spectrum pulse is configured to give a second complex carrier signal having a hyperbolic instantaneous frequency function.

Figure 8:
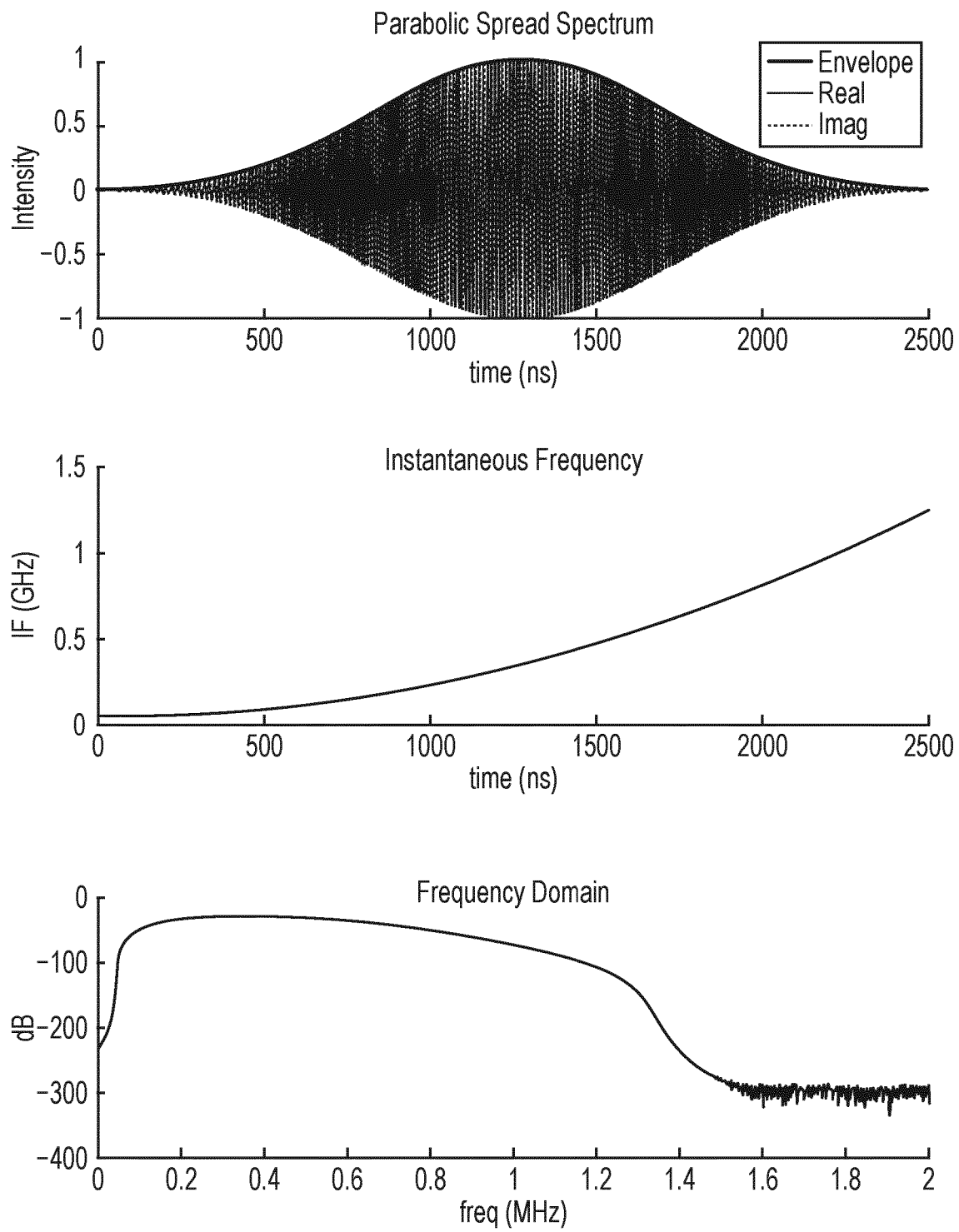
FIG. 8 shows a series of graphs relating to a spread spectrum pulse.

FIG. 8 shows a series of graphs relating to an example spread spectrum pulse which may be used in a second example of a spread spectrum DAS system. The middle graph of FIG. 8 ("Instantaneous Frequency") shows that the instantaneous frequency of the pulse is increased parabolically from near 0 GHz to 1.5 GHZ over the length of the pulse. As shown in the top graph of FIG. 8 ("Parabolic Spread Spectrum"), the pulse preferably has a Blackman envelope to help with side lobe rejection (see below), but any other pulse envelope shape may also be considered in embodiments of the present invention.

Figure 9:
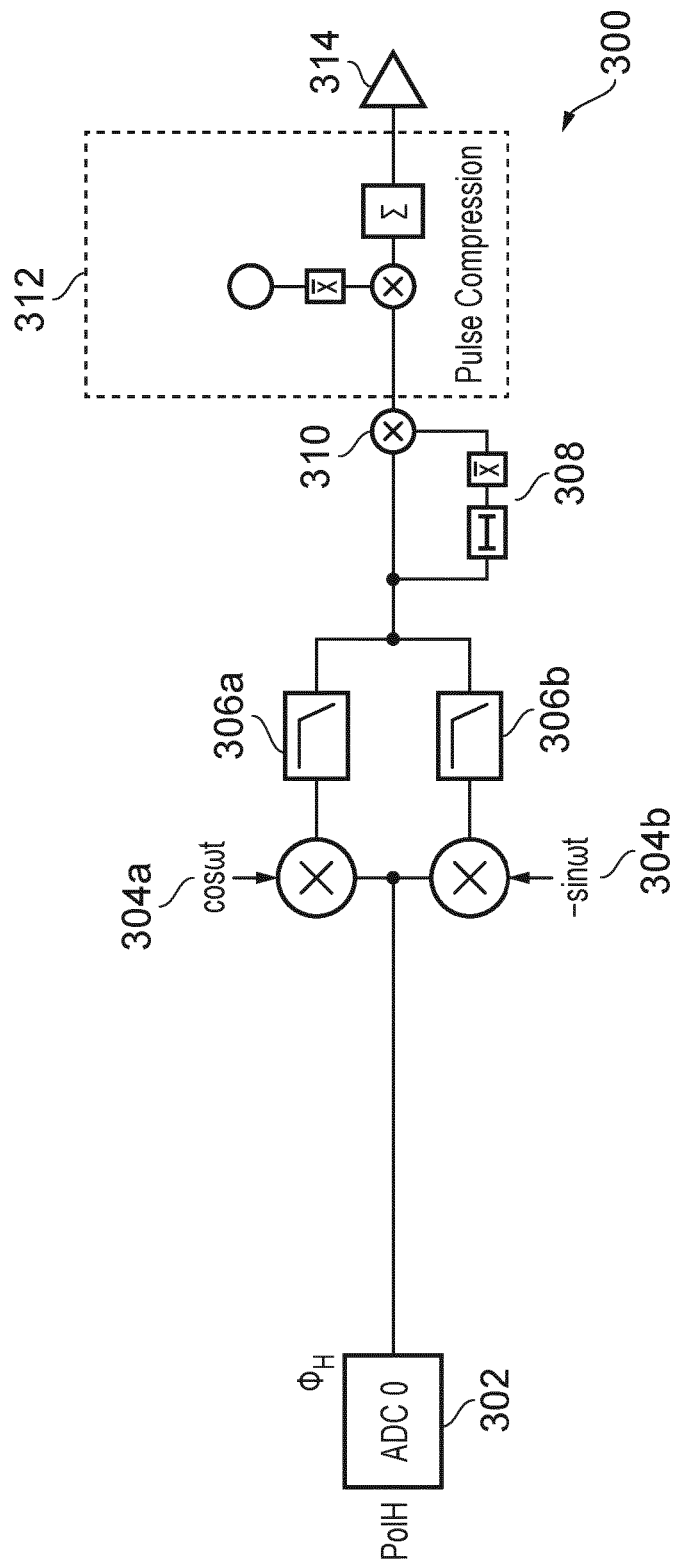
FIG. 9 is s schematic diagram showing a portion of a signal processing method according to another embodiment of the present invention.

FIG. 9 is a schematic diagram showing a portion of a signal processing method according to an embodiment of the present invention for a DAS system which utilises a single spread spectrum pulse, such as the spread spectrum pulse described above with respect to FIG. 8.

The signal processing diagram 300 starts with a real carrier signal which is output from an ADC 302. In particular, the ADC 302 may be configured to output a signal which is representative of the interference between a scatter signal that was scattered from a location along an optical path and a local oscillator signal, as discussed above. The output signal of the ADC 302, which is a real carrier signal, is then split into two parts, with one part being multiplied by an in-phase component (cos ωt) 304a and one part being multiplied by a quadrature component (−sin ωt) 304b. This has the effect of shifting the carrier signal down, such that the desired positive frequency term is centred at DC. Each of these parts is passed through a lowpass filter 306a, 306b to remove the unwanted terms and the outputs of the lowpass filter 306a, 306b recombined into a complex signal. This recombined signal is the first complex carrier signal, generated in step 108 of the method 100 discussed above, which is modulated by a phase difference between the local oscillator signal and the scattered signal. At this point, the first complex carrier signal shows the cumulative phase acquired by the scattered signal.

Figure 10:
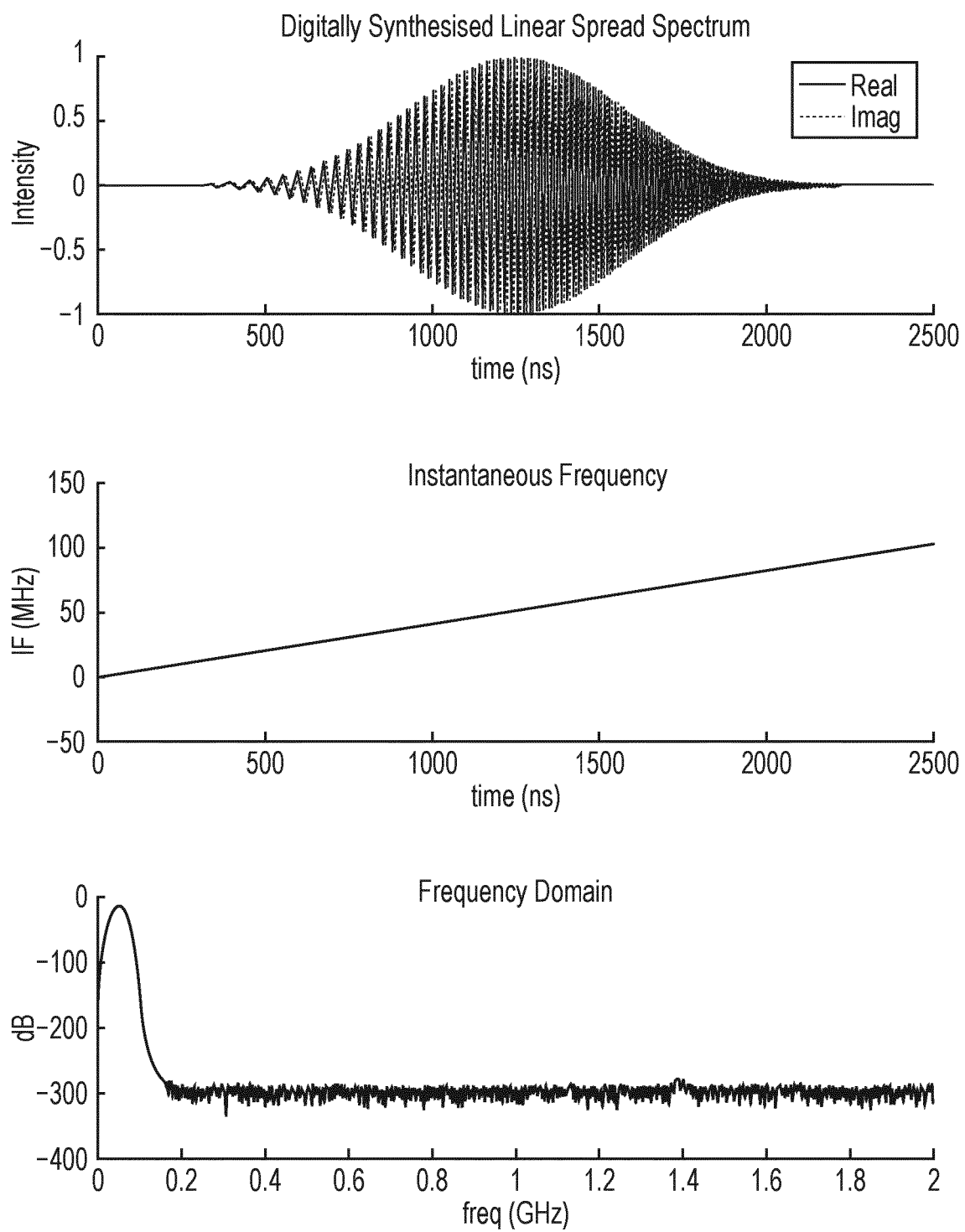
FIG. 10 shows a series of graphs relating to another second complex carrier signal.

The first complex carrier signal is again divided into two parts. A first part of the first complex carrier signal is unchanged, while a second part of the first complex carrier signal is delayed and undergoes complex conjugation 308. The delay introduced to the second part of the first complex carrier signal is configured to delay this second part by an amount equal to the gauge length, which may be set by an operator. This gauge length effectively decides the spatial resolution, as it determines the distance between locations n and n+1 as shown in equation (4) above. The first part of the first complex carrier signal and the delayed and conjugated second part of the first complex carrier signal are then multiplied 310, generating a spread spectrum second complex carrier signal that is modulated by a spatial differential of the phase difference. This is shown as step 110 of the method 100 described above. The second complex carrier signal, being generated in this way, therefore carries the spatial differential phase of the scattered signal. As the original spread spectrum pulse is a parabolically chirped signal, the second complex carrier signal—which carries the spatial differential information—is a digitally synthesised linear spread spectrum signal. The properties of the second complex carrier signal are therefore dependent on the original spread spectrum pulse, and the spread spectrum pulse is modulated to ensure that the second complex carrier signal has the desired properties. An example of such a second complex carrier signal for this method is shown in FIG. 10. This example shows the parabolic pulse requirements for a 10 m gauge length generating a spread spectrum second complex carrier with a linear instantaneous frequency function between 0 and 100 MHZ.

The second complex carrier signal then undergoes pulse compression 312. The second complex carrier signal is correlated with a reference or kernel signal, which is a time-reversed complex conjugate of the instantaneous frequency function of the second complex carrier signal.

At step 314 the pulse-compressed complex carrier signal is passed on for further processing into order to determine a value representative of the spatial differential of the phase different for the location along the optical path. For example, the pulse-compressed second complex carrier signal can be passed to a rectangular-to-polar (RP) coordinate transform, or a vector stacking method may be used to determine a value representative of the spatial differential, as described in GB 2588177 A. Any appropriate method can be used to determine a value representative of the spatial differential from the pulse compressed second complex carrier signal in this way.

FIG. 10 shows an example of a second complex carrier signal, generated according to the method described above with respect to FIG. 9 based on a spread spectrum pulse as described above with respect to FIG. 6. The second complex carrier signal contains information relating to the spatial differential of phase, rather than a cumulative phase. In this example, where the original pulse had an instantaneous frequency which increases parabolically from near 0 GHz to 1.5 GHZ over the length of the pulse, the second complex carrier signal has a linear instantaneous frequency function which increased from 0 MHz to 100 MHz over the length of the pulse.

Figure 11:
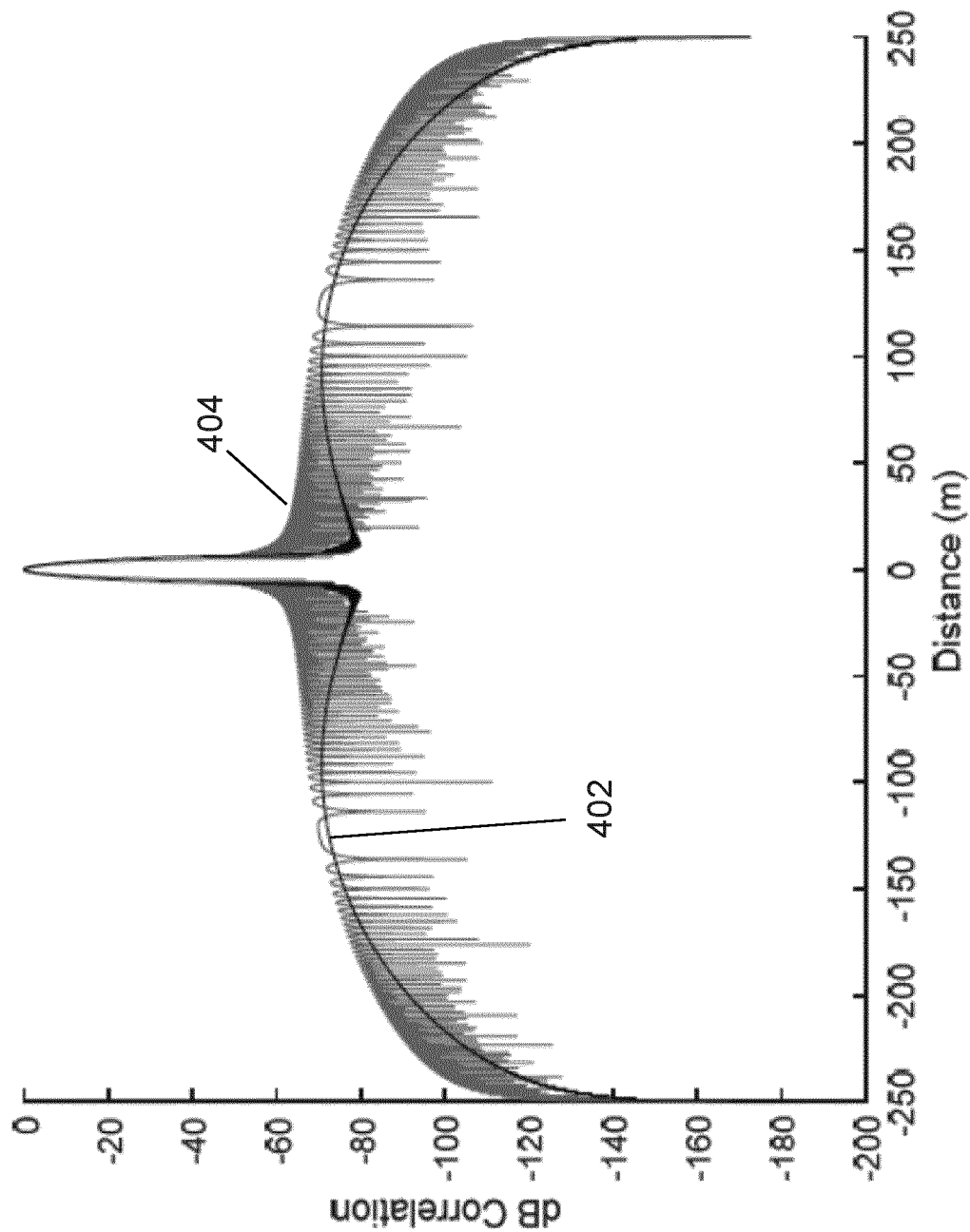
FIG. 11 is a graph of two pulse compressed second complex carrier signals.

FIG. 11 shows a graph of two pulse compressed second complex carrier signals. A first pulse compressed signal 402 is shown which represents a synthetically generated linearly chirped pulse, such as a second complex carrier signal as described above with respect to FIG. 8. A second pulse compressed signal 404 is also shown which represents a pulse-compressed, Blackman windowed linearly chirped pulse with a bandwidth of 100 MHz. It can therefore be seen from FIG. 11 that the digitally synthesised signal 402 is an accurate estimation of a linearly chirped pulse signal 404, particularly around the peak region.

Figure 12:
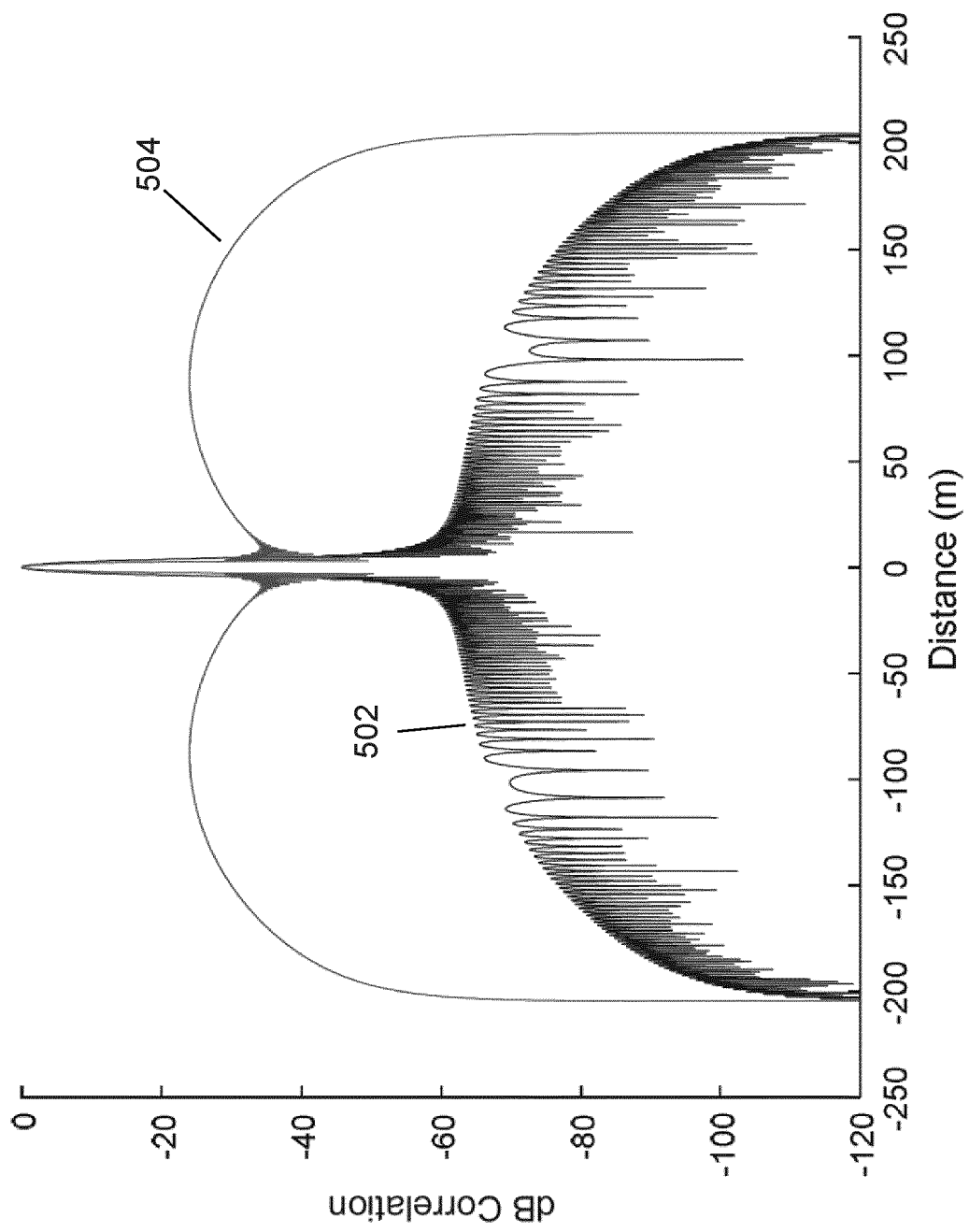
FIG. 12 is a graph showing the difference in correlation properties for a rectangular pulse compared to a pulse whose envelope is defined by a Blackman function.

FIG. 12 shows the difference in correlation properties, in particular side lobe rejection and central lobe width, for a rectangular pulse compared to a pulse whose envelope is defined by a Blackman function, after pulse compression. For example, the pulse shapes of the spread spectrum complex carrier signal as described above may have a rectangular pulse window or a Blackman pulse window based on the pulse window shapes of the spread spectrum pulsed test signal as described herein, thereby allowing predetermined sidelobe rejection thresholds and central lobe widths to be achieved.

Curve 502 shows the effect of pulse compression of a signal having a pulse window defined by a Blackman function. For example, the second complex carrier signal may have a pulse window defined by a Blackman function if the pulsed test signal has a pulse window defined by a square-root Blackman function as described above. It can be seen from FIG. 12 that curve 502 provides a sidelobe rejection threshold of greater than 60 dB, while the central lobe width, and hence spatial resolution, is around 3.5 m.

Curve 504 shows the effect of pulse compression of a signal having a pulse window defined by a rectangular function. For example, the second complex carrier signal may have a pulse window defined by a rectangular function if the pulsed test signal has a pulse window defined by a square-root rectangular function (e.g. since function) as described above. It can be seen from FIG. 12 that curve 504 provides a sidelobe rejection threshold of around 23 dB, while the central lobe width, and hence spatial resolution, is around 2.2 m. That is, the rectangular pulse window provides improved spatial resolution at a cost of a lower sidelobe rejection threshold.

Although a few preferred embodiments have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except where at least some of such features and/or steps are mutually exclusive.

Each feature disclosed in this specification (including any accompanying claims, abstract and drawings) may be replaced by alternative features serving the same, equivalent or similar purposes, unless expressly stated otherwise. Thus, unless expressly stated otherwise, each feature disclose is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A signal processing method for a distributed acoustic sensing system, the method comprising:
   transmitting a spread spectrum pulsed test signal along an optical path;
   receiving, at a detector stage, a scattered signal that was scattered from a plurality of locations along the optical path;
   receiving, at the detector stage, a local oscillator signal;
   generating, based on an interference of the scattered signal and the local oscillator signal, a first complex carrier signal that is modulated by a phase difference between the local oscillator signal and the scattered signal;
   processing the first complex carrier signal to generate a spread spectrum second complex carrier signal that is modulated by a spatial differential of the phase difference between the local oscillator signal and the scattered signal, the spatial differential being taken along a length of the optical path;
   pulse compressing the second complex carrier signal; and
   determining, based on the pulse compressed second complex carrier signal, a value representative of the spatial differential of the phase difference for the location along the optical path, wherein processing the first complex carrier signal comprises digitally simulating interference of the first complex carrier signal with a delayed copy of the first complex carrier signal, to generate the second complex carrier signal, and
wherein the spread spectrum pulsed test signal is configured to provide a pulse compressed second complex carrier signal having a predetermined sidelobe rejection threshold and central lobe width.

2. A signal processing method according to claim 1, wherein the spread spectrum pulsed test signal is configured to provide a second complex carrier signal having a hyperbolic instantaneous frequency function.

3. A signal processing method according to claim 1, wherein the spread spectrum pulsed test signal has pulse window defined by a square-root Blackman function to provide a second complex carrier signal having a pulse window defined by a Blackman function.

4. A signal processing method according to claim 1, wherein pulse compressing the second complex carrier signal comprises:
correlating the second complex carrier signal with a time-reversed, conjugated copy of an instantaneous frequency function of the spread spectrum second complex carrier signal.

5. A signal processing method according to claim 1, wherein transmitting a spread spectrum pulsed test signal comprises:
transmitting a pulsed test signal with a non-linearly increasing instantaneous frequency function.

6. A signal processing method according to claim 5, wherein the pulsed test signal has a parabolically increasing instantaneous frequency function.

7. A signal processing method according to claim 1, wherein generating the first complex carrier signal comprises a step of digital down conversion based on the interference of the scattered signal and the local oscillator signal.

8. A signal processing method according to claim 1, wherein transmitting the spread spectrum pulsed test signal comprises:
transmitting a first spread spectrum test pulse and a second spread spectrum test pulse, wherein the second spread spectrum test pulse is delayed relative to the first spread spectrum test pulse, and wherein the first spread spectrum test pulse and the second spread spectrum test pulse have different instantaneous frequency functions.

9. A signal processing method according to claim 8, wherein the first spread spectrum test pulse and the second spread spectrum test pulse each have a linearly increasing instantaneous frequency function.

10. A signal processing method according to claim 8, wherein the instantaneous frequency of the second test pulse is a fixed multiple of the first spread spectrum test pulse along the length of the second test pulse.

11. A signal processing method according to claim 8, wherein at least one of the first spread spectrum test pulse and the second spread spectrum test pulse has a non-linearly increasing instantaneous frequency function.

12. A signal processing method according to claim 8, wherein:
the scattered signal includes a first scattered signal corresponding to the first spread spectrum test pulse and a second scattered signal corresponding to the second spread spectrum test pulse;
generating the first complex carrier signal includes generating a first complex carrier signal associated with the first scattered signal and a first complex carrier signal associated with the second scattered signal; and
the step of processing the first complex carrier signal includes processing the first complex carrier signal associated with the first scattered pulse and the first complex carrier signal associated with the second scattered pulse to generate the second complex carrier signal.

13. A signal processing method according to claim 12, wherein processing the first complex carrier signal associated with the first scattered signal and the first complex carrier signal associated with the second scattered signal includes multiplying the first complex carrier signal associated with the first scattered signal by a complex conjugate of the first complex carrier signal associated with the second scattered signal.

14. A distributed acoustic sensing system comprising:
a pulse generator configured to transmit a spread spectrum pulsed test signal along an optical path;
a detector stage configured to receive a test signal that was scattered along an optical path and a local oscillator signal; and
a controller configured to perform a method according to claim 1.

15. A distributed acoustic sensing system according to claim 14, wherein the pulse is configured to generate a spread spectrum pulsed test signal having a non-linearly increasing instantaneous frequency function.

16. A distributed acoustic sensing system according to claim 14, wherein the pulse generator transmits a spread spectrum pulsed test signal configured to provide a pulse compressed second complex carrier signal with a predetermined side lobe rejection threshold and central lobe width.

17. A distributed acoustic sensing system according to claim 1, wherein the pulse generator is configured to generate a first spread spectrum test pulse and a second spread spectrum test pulse, wherein the second spread spectrum test pulse is delayed relative to the first spread spectrum test pulse.

18. A distributed acoustic sensing system according to claim 17, wherein the first spread spectrum test pulse and the second spread spectrum test pulse have different instantaneous frequency functions.

19. A distributed acoustic sensing system according to claim 17, wherein the pulse generator comprises a variable optical delay line.

20. A distributed acoustic sensing system according to claim 17, wherein the pulse generator comprises a first optic modulator configured to generate the first spread spectrum test pulse and a second optic modulator configured to generate the second spread spectrum test pulse.

21. A distributed acoustic sensing system according to claim 20, wherein the first optic modulator and the second optical modulator are each configured to generate spread spectrum test pulses having a linearly increasing instantaneous frequency function.

* * * * *